US011546395B2

(12) United States Patent
Sukhov et al.

(10) Patent No.: US 11,546,395 B2
(45) Date of Patent: Jan. 3, 2023

(54) EXTREMA-RETENTIVE DATA BUFFERING AND SIMPLIFICATION

(71) Applicant: Geotab Inc., Oakville (CA)

(72) Inventors: Alexey Sukhov, Georgetown (CA); Cristian Frincu, Vancouver (CA); Darren Marc Lohmann Beams, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/194,659

(22) Filed: Mar. 8, 2021

(65) Prior Publication Data
US 2022/0166813 A1 May 26, 2022

Related U.S. Application Data

(60) Provisional application No. 63/117,577, filed on Nov. 24, 2020.

(51) Int. Cl.
*H04L 65/61* (2022.01)
*H04L 65/65* (2022.01)
*G06F 9/54* (2006.01)
*H04L 12/40* (2006.01)

(52) U.S. Cl.
CPC .......... *H04L 65/61* (2022.05); *G06F 9/544* (2013.01); *H04L 12/40* (2013.01); *H04L 65/65* (2022.05); *H04L 2012/40215* (2013.01)

(58) Field of Classification Search
None
See application file for complete search history.

(56) References Cited

U.S. PATENT DOCUMENTS

| 4,936,678 | A | 6/1990 | Gordon |
| 5,173,691 | A | 12/1992 | Sumner |
| 5,225,842 | A | 7/1993 | Brown et al. |
| 5,311,197 | A | 5/1994 | Sorden et al. |
| 5,758,313 | A | 5/1998 | Shah et al. |
| 5,815,093 | A | 9/1998 | Kikinis |
| 5,844,473 | A | 12/1998 | Kaman |
| 5,884,216 | A | 3/1999 | Shah et al. |

(Continued)

FOREIGN PATENT DOCUMENTS

WO 2016/118672 A2 7/2016

OTHER PUBLICATIONS

Elmar de Konig, "psimpl generic n-dimensional poyline simplification Douglar-Peucker" (Year: 2010).*

(Continued)

*Primary Examiner* — Chris Parry
*Assistant Examiner* — Abderrahmen Chouat
(74) *Attorney, Agent, or Firm* — Wolf, Greenfield & Sacks, P.C.

(57) ABSTRACT

Methods and devices for asset tracking are provided. An example method involves obtaining a stream of raw data, adding data points from the stream of raw data to a data buffer in a first cycle of data, performing a dataset simplification algorithm on the first cycle of data to determine whether one or more data points from the first cycle of data are to be recorded, preparing the data buffer for a second cycle of data, including determining a group of carry-over data points to be included in the second cycle of data, and continuing to add data points from the stream of raw data to the data buffer in the second cycle of data.

17 Claims, 15 Drawing Sheets

(56) References Cited

U.S. PATENT DOCUMENTS

| | | |
|---|---|---|
| 5,919,239 A | 7/1999 | Fraker |
| 5,922,040 A | 7/1999 | Prabhakaran |
| 6,002,982 A | 12/1999 | Fry |
| 6,088,648 A | 7/2000 | Shah et al. |
| 6,131,066 A | 10/2000 | Ahrens |
| 6,211,820 B1 | 4/2001 | Zou |
| 6,240,294 B1 | 5/2001 | Hamilton et al. |
| 6,282,362 B1 | 8/2001 | Murphy |
| 6,285,953 B1 | 9/2001 | Harrison |
| 6,363,320 B1 | 3/2002 | Chou |
| 6,366,851 B1* | 4/2002 | Chojnacki .............. G01C 21/32 701/467 |
| 6,388,581 B1 | 5/2002 | Barker |
| 6,389,340 B1 | 5/2002 | Rayner |
| 6,434,631 B1 | 8/2002 | Bruno |
| 6,473,030 B1 | 10/2002 | McBurney et al. |
| 6,493,631 B1 | 12/2002 | Burns |
| 6,526,341 B1 | 2/2003 | Bird et al. |
| 6,542,077 B2 | 4/2003 | Joao |
| 6,556,905 B1 | 4/2003 | Mittelsteadt et al. |
| 6,636,790 B1 | 10/2003 | Lightner et al. |
| 6,646,594 B1 | 11/2003 | Barber et al. |
| 6,718,239 B2 | 4/2004 | Rayner |
| 6,845,318 B1 | 1/2005 | Moore et al. |
| 6,865,457 B1 | 3/2005 | Mittelsteadt et al. |
| 6,922,133 B2 | 7/2005 | Wolfe |
| 7,085,576 B2 | 8/2006 | Ranganathan |
| 7,123,188 B2 | 10/2006 | Needham |
| 7,155,376 B2 | 12/2006 | Yang |
| 7,468,661 B2 | 12/2008 | Petite et al. |
| 7,538,690 B1 | 5/2009 | Kaplan et al. |
| 7,693,662 B2 | 4/2010 | Yamada |
| 8,032,276 B2 | 10/2011 | Cawse |
| 8,670,928 B2 | 3/2014 | Cawse |
| 8,706,348 B2 | 4/2014 | Beams et al. |
| 9,536,561 B1* | 1/2017 | Hasegawa .......... G11B 5/00817 |
| 9,600,540 B1 | 3/2017 | Bruno |
| 10,706,605 B1 | 7/2020 | Russo et al. |
| 10,878,328 B2 | 12/2020 | Mathur et al. |
| 2001/0047244 A1 | 11/2001 | Harrison et al. |
| 2002/0035422 A1 | 3/2002 | Sasaki |
| 2002/0049529 A1 | 4/2002 | Ikeda |
| 2002/0190851 A1 | 12/2002 | Skibinski |
| 2003/0040272 A1 | 2/2003 | Lelievre |
| 2003/0149530 A1 | 8/2003 | Stopczynski |
| 2003/0169161 A1 | 9/2003 | Brown |
| 2003/0169185 A1 | 9/2003 | Taylor |
| 2004/0119612 A1 | 6/2004 | Chen |
| 2004/0181495 A1 | 9/2004 | Grush |
| 2004/0192342 A1 | 9/2004 | Ranganathan |
| 2004/0239488 A1 | 12/2004 | Douglass et al. |
| 2005/0065711 A1 | 3/2005 | Dahlgren et al. |
| 2005/0171663 A1 | 8/2005 | Mittelsteadt et al. |
| 2006/0119507 A1 | 6/2006 | Cawse |
| 2006/0176193 A1 | 8/2006 | Wraight |
| 2006/0184013 A1 | 8/2006 | Emanuel |
| 2007/0073450 A1 | 3/2007 | Ampunan et al. |
| 2007/0255531 A1* | 11/2007 | Drew .................. A61B 5/4094 702/189 |
| 2008/0002797 A1* | 1/2008 | Raman ................ H04B 1/7075 375/355 |
| 2008/0221776 A1 | 9/2008 | McClellan |
| 2008/0252487 A1 | 10/2008 | McClellan et al. |
| 2008/0255722 A1 | 10/2008 | McClellan et al. |
| 2008/0258890 A1 | 10/2008 | Follmer et al. |
| 2008/0262670 A1 | 10/2008 | McClellan et al. |
| 2008/0294690 A1 | 11/2008 | McClellan et al. |
| 2009/0051510 A1 | 2/2009 | Follmer et al. |
| 2010/0135389 A1 | 6/2010 | Tanizawa et al. |
| 2011/0130916 A1 | 6/2011 | Mayer |
| 2011/0202305 A1 | 8/2011 | Willis et al. |
| 2011/0239789 A1 | 10/2011 | Takahashi et al. |
| 2011/0286302 A1 | 11/2011 | Welker et al. |
| 2012/0010810 A1 | 1/2012 | Cawse |
| 2012/0052870 A1 | 3/2012 | Habicher |
| 2012/0123632 A1 | 5/2012 | Nejah |
| 2012/0226391 A1* | 9/2012 | Fryer ................ G01C 21/3407 701/1 |
| 2012/0303203 A1 | 11/2012 | Olsen et al. |
| 2013/0013347 A1 | 1/2013 | Ling et al. |
| 2013/0030642 A1 | 1/2013 | Bradley et al. |
| 2013/0080022 A1 | 3/2013 | McDonald |
| 2013/0158368 A1 | 6/2013 | Pacione et al. |
| 2013/0169644 A1 | 7/2013 | Bolton |
| 2013/0211578 A1 | 8/2013 | Tanuma et al. |
| 2013/0278594 A1 | 10/2013 | Kaatz et al. |
| 2014/0040324 A1 | 2/2014 | Marcolino et al. |
| 2014/0375052 A1 | 12/2014 | Nielsen |
| 2015/0224845 A1 | 8/2015 | Anderson et al. |
| 2016/0186562 A1 | 6/2016 | Lee et al. |
| 2016/0212589 A1 | 7/2016 | Cawse et al. |
| 2016/0321154 A1* | 11/2016 | Prytz .................. G06F 13/1673 |
| 2017/0004137 A1* | 1/2017 | Raina .................. G06F 16/252 |
| 2017/0023379 A1 | 1/2017 | El-Ghazal et al. |
| 2017/0067404 A1* | 3/2017 | Yonan .................. G01M 15/06 |
| 2017/0149601 A1 | 5/2017 | Cawse et al. |
| 2017/0161965 A1 | 6/2017 | Du et al. |
| 2017/0219360 A1* | 8/2017 | Cui ........................ G01C 21/34 |
| 2017/0249402 A1* | 8/2017 | Liu ........................ G06F 13/00 |
| 2017/0250855 A1 | 8/2017 | Patil et al. |
| 2017/0309045 A1* | 10/2017 | Asente ...................... G06T 3/40 |
| 2017/0309092 A1 | 10/2017 | Rosenbaum |
| 2017/0364821 A1 | 12/2017 | Mathur et al. |
| 2018/0041965 A1 | 2/2018 | Korneluk et al. |
| 2018/0112990 A1 | 4/2018 | Fowe et al. |
| 2018/0179888 A1 | 6/2018 | Switzer et al. |
| 2018/0284736 A1 | 10/2018 | Celia et al. |
| 2019/0102840 A1 | 4/2019 | Perl et al. |
| 2019/0196501 A1 | 6/2019 | Lesher et al. |
| 2020/0033142 A1* | 1/2020 | Flug ...................... G01C 21/32 |
| 2020/0118355 A1 | 4/2020 | Soda et al. |
| 2020/0145304 A1 | 5/2020 | Wulff et al. |
| 2021/0271474 A1* | 9/2021 | Batra .................... G06F 9/3897 |
| 2021/0390110 A1 | 12/2021 | Bjorkengren |
| 2022/0035778 A1 | 2/2022 | Sukhov et al. |
| 2022/0035779 A1 | 2/2022 | Sukhov et al. |
| 2022/0035780 A1 | 2/2022 | Sukhov et al. |
| 2022/0090933 A1* | 3/2022 | Corbiere .............. B60W 50/14 |
| 2022/0166834 A1 | 5/2022 | Sukhov et al. |
| 2022/0171753 A1* | 6/2022 | Baker, Jr. ............. G06K 9/6215 |

OTHER PUBLICATIONS

Renee Van Hunnik "Extensive Comparison of Trajectory Simplification Algorithms", Utrecht University (Year: 2017).*
U.S. Appl. No. 16/928,064, filed Jul. 14, 2020, Bjorkengren.
U.S. Appl. No. 16/928,071, filed Jul. 14, 2020, Bjorkengren.
U.S. Appl. No. 17/211,671, filed Mar. 24, 2021, Bjorkengren.
U.S. Appl. No. 17/083,972, filed Oct. 29, 2020, Sukhov et al.
U.S. Appl. No. 17/084,008, filed Oct. 29, 2020, Sukhov et al.
U.S. Appl. No. 17/084,062, filed Oct. 29, 2020, Sukhov et al.
U.S. Appl. No. 17/084,086, filed Oct. 29, 2020, Sukhov et al.
U.S. Appl. No. 17/194,792, filed Mar. 8, 2021, Sukhov et al.
Bjorkengren, Dataset simplification of multidimensional signals captured for asset tracking. Co-pending U.S. Appl. No. 16/928,064, filed Jul. 14, 2020.
Bjorkengren, Dataset simplification of n-dimensional signals captured for asset tracking. Co-pending U.S. Appl. No. 16/928,071, filed Jul. 14, 2020.
Bjorkengren, Dataset simplification of n-dimensional signals captured for asset tracking. Co-pending U.S. Appl. No. 17/211,671, filed Mar. 24, 2021.
Sukhov et al., Methods and devices for fixed interpolation error data simplification processes for telematics. Co-pending U.S. Appl. No. 17/083,972, filed Oct. 29, 2020.
Sukhov et al., Methods and systems for fixed interpolation error data simplification processes for telematics. Co-pending U.S. Appl. No. 17/084,008, filed Oct. 29, 2020.
Sukhov et al., Methods and devices for fixed extrapolation error data simplification processes for telematics. Co-pending U.S. Appl. No. 17/084,062, filed Oct. 29, 2020.

(56) References Cited

OTHER PUBLICATIONS

Sukhov et al., Methods and systems for fixed extrapolation error data simplification processes for telematics. Co-pending U.S. Appl. No. 17/084,086, filed Oct. 29, 2020.

Sukhov et al., Extrema-retentive data buffering and simplification. Co-pending U.S. Appl. No. 17/194,792, filed Mar. 8, 2021.

[No Author Listed] Global Positioning System. Wikipedia. https://en.wikipedia.org/w/index.php?title=Global_Positioning_System&oldid=959561822 [last accessed May 29, 2020]. Sep. 13, 2020:21 pages.

[No Author Listed] On-Board Diagnostics. Wikipedia. https://en.wikipedia.org/w/index.php?title=On-board_diagnostics&oldid=959687904#Vehicle_telematics [last accessed May 30, 2020]. Sep. 12, 2020:15 pages.

[No Author Listed] Ramer-Douglas Peucker Algorithm. Wikipedia. https://en.wikipedia.org/w/index.php?title=Ramer-Douglas-Peucker_algorithm&oldid=942730100 [last accessed Feb. 26, 2020]. Aug. 22, 2020:4 pages.

Bhattacharya et al., Robust and energy-efficient trajectory tracking for mobile devices. IEEE Transactions on Mobile Computing. Apr. 25, 2014;14(2):430-43.

Douglas et al., Algorithms for the reduction of the number of points required to represent a digitized line or its caricature. Cartographica: the international journal for geographic information and geovisualization. Oct. 1, 1973; 10(2):112-22.

Gudmundsson et al., Compressing spatio-temporal trajectories. Computational Geometry. Nov. 1, 2009;42(9):825-41.

Holzinger et al., Hierarchical coupling approach utilizing multi-objective optimization for non-iterative co-simulation. Proceedings of the 13th International Modelica Conference, Regensburg, Germany, Mar. 4-6, 2019:735-40.

Kjærgaard et al., Energy-efficient trajectory tracking for mobile devices. MobiSys '11: Proceedings of the 9th International Conference on Mobile Systems, Applications, and Services. Jun. 28, 2011:307-320.

Lange et al., Efficient real-time trajectory tracking. The VLDB Journal. Oct. 2011;20(5):671-94.

Lopes et al., Traffic and mobility data collection for real-time applications. 13th International IEEE Conference on Intelligent Transportation Systems. Sep. 19, 2010:216-23.

Teng et al., Location-awareness in time series compression. European Conference on Advances in Databases and Information Systems. Sep. 2, 2018:82-95.

Wu et al., CLSTERS: A general system for reducing errors of trajectories under challenging localization situations. Proceedings of the ACM on Interactive, Mobile, Wearable and Ubiquitous Technologies. Sep. 11, 2017;1(3):1-28.

Extended European Search Report for European Application No. 21206528.8, dated Apr. 19, 2022.

Extended European Search Report for European Application No. 21207417.3, dated Apr. 19, 2022.

Kononen et al., Identification and validation of a logistic regression model for predicting serious injuries associated with motor vehicle crashes. Accident Analysis & Prevention. Jan. 1, 2011;43(1):112-22.

Van Hunnik, Extensive comparison of trajectory simplification algorithms. Utrecht University MS Thesis. Feb. 9, 2017:1-22.

\* cited by examiner

EXTREMA-RETENTIVE DATA BUFFERING AND SIMPLIFICATION

RELATED APPLICATIONS

This application claims the benefit under 35 U.S.C. § 119(e) to U.S. provisional Application Ser. No. 63/117,577, titled "EXTREMA-RETENTIVE DATA BUFFERING AND SIMPLIFICATION", filed on Nov. 24, 2020, which is herein incorporated by reference in its entirety.

FIELD

The present disclosure relates to telematics, and in particular to the collection of data from assets tracked by telematics systems.

BACKGROUND

In the field of telematics, the location of an asset, such as a vehicle, and other data pertaining to the asset, may be monitored by an asset tracking device integrated within the asset itself or by another asset tracking device placed onboard the asset. The location of the asset may be tracked through the use of a satellite navigation system, such as a Global Positioning System (GPS), Global Navigation Satellite System (GNSS), cellular tower network, or other system. Other data may be collected through sensors (e.g., accelerometers, temperature sensors), or through Electronic Control Units (ECUs) of the asset, from which a variety of data may be obtained, such as, in the case of the asset being a vehicle: engine speed, battery temperature, fuel level, tire pressure, and other data. Such data may be made available over a Controlled Area Network (CAN) accessible directly by an ECU or by an asset tracking device through a communication port (e.g., an OBD2 port). In any case, such data may be transmitted to, and recorded at, a back-end data collection system to be used in the provision of a telematics service, such as a fleet management tool, or for analysis.

SUMMARY

According to an aspect of the disclosure, a method for asset tracking in accordance with an extrema-retentive data buffering and simplification process is provided. The method involves obtaining a stream of raw data, adding data points from the stream of raw data to a data buffer in a first cycle of data, performing a dataset simplification algorithm on the first cycle of data to determine whether one or more data points from the first cycle of data are to be recorded, preparing the data buffer for a second cycle of data, including determining a group of carry-over data points to be included in the second cycle of data, continuing to add data points from the stream of raw data to the data buffer in the second cycle of data.

According to another aspect of the disclosure, an asset tracking device that employs an extrema-retentive data buffering and simplification process is provided. The device includes an interface layer to receive a stream of raw data, a data buffer to store cycles of raw data received by the interface layer along with dynamic groups of carry-over data points, a memory to store simplified data derived from the raw data, and a controller. The controller, when triggered, performs a dataset simplification algorithm on a set of data that contains a cycle of raw data and a dynamic group of carry-over data points, to determine whether one or more data points in the set of data are to be recorded in the memory as part of the simplified data. Further, the controller, when triggered, prepares the data buffer for a new cycle of raw data by pre-filling the data buffer with a dynamic group of carry-over data points that includes: (i) a last data point from an immediately previous cycle of raw data, (ii) a last data point determined to be recorded in the memory from the immediately previous cycle of raw data or an earlier cycle of raw data.

According to yet another aspect of the disclosure, a system that employs an extrema-retentive data buffering and simplification process is provided. The system includes a server and an asset tracking device onboard an asset. The asset tracking device is to receive raw data pertaining to the asset, determine a dynamic group of carry-over data points, derived from the raw data, to be used in the performance of a dataset simplification algorithm on the raw data, perform the dataset simplification algorithm on a set of data that contains the raw data and the dynamic group of carry-over data points to determine one or more data points in the set of data to be recorded, and transmit the recorded data points to the server.

According to yet another aspect of the disclosure, a non-transitory machine-readable storage medium that is executable by one or more processors to perform an extrema-retentive data buffering and simplification process is provided. The instructions cause the one or more processors to: obtain raw data pertaining to an asset, determine a group of carry-over data points, derived from the raw data, to be used in the performance of a dataset simplification algorithm on the raw data, perform the dataset simplification algorithm on a set of data that contains the raw data and the group of carry-over data points to determine one or more data points in the set of data to be recorded, and transmit the recorded data points to the server.

The group of carry-over data points may include (i) a last data point added to the first cycle of data, and (ii) where it is determined that one or more data points from the first cycle of data are to be recorded: a last data point determined to be recorded from the first cycle of data, else a last recorded data point from an earlier cycle of data. The group of carry-over data points may further include (iii) a data point between data point (i) and data point (ii) that deviates the most from a reference line defined through data point (i) and data point (ii).

The data buffer may be limited in size to contain no more than four data points, including data point (i), data point (ii), data point (iii), and (iv) a new data point added to the data buffer to be considered for recordation.

Performing the dataset simplification algorithm may involve comparing, against a first threshold value, a distance of a data point to be considered for recordation to a reference line in accordance with the dataset simplification algorithm. The method may further involve comparing, against a second threshold value that is less than the first threshold value, a distance of data point (iii) to its relevant reference line as defined by the dataset simplification algorithm, and when it is determined that the distance of data point (iii) to the relevant reference line is greater than the second threshold value, forcing data point (i) to be recorded.

The method may further involve, following performance of the dataset simplification algorithm: generating (i) a placeholder data point, immediately following (ii) a last data point in the first cycle of data, that deviates as much as possible, within an allowable error threshold of the dataset simplification algorithm, from a first reference line defined through data point (ii) and (iii) a last data point in the first cycle of data determined to be recorded by the dataset simplification algorithm; determining whether any data points between data point (ii) and data point (iii) deviate, in excess of the allowable error threshold of the dataset simplification algorithm, from a second reference line defined through data point (i) and (iv) a data point between data point (ii) and data point (iii) that deviates the most from the first reference line; and, when it is determined that there is at least one data point between data point (ii) and data point (iii) that deviates, in excess of the allowable error threshold of the dataset simplification algorithm, from the second reference line, forcing data point (ii) to be recorded.

The dataset simplification algorithm may be performed each time a new data point is added to the data buffer from the stream of raw data. Preparing the data buffer for the second cycle of data may involve removing, each time a new data point is to be added to the data buffer, a least significant data point from the data buffer, and retaining the remaining data points in the data buffer.

The dataset simplification algorithm may be performed upon satisfaction of a data logging trigger, wherein satisfaction of the data logging trigger includes the data buffer being filled, a timer expiring, or a data point obtained from the stream of raw data deviating from an expected range in excess of a threshold amount.

The raw data may pertain to an asset, and describes a property, state, or operating condition of the asset. The stream of raw data may be obtained from a data source onboard an asset, and the data source comprises an electronic control unit (ECU) of the asset or a sensor onboard the asset.

DETAILED DESCRIPTION

Figure 1:
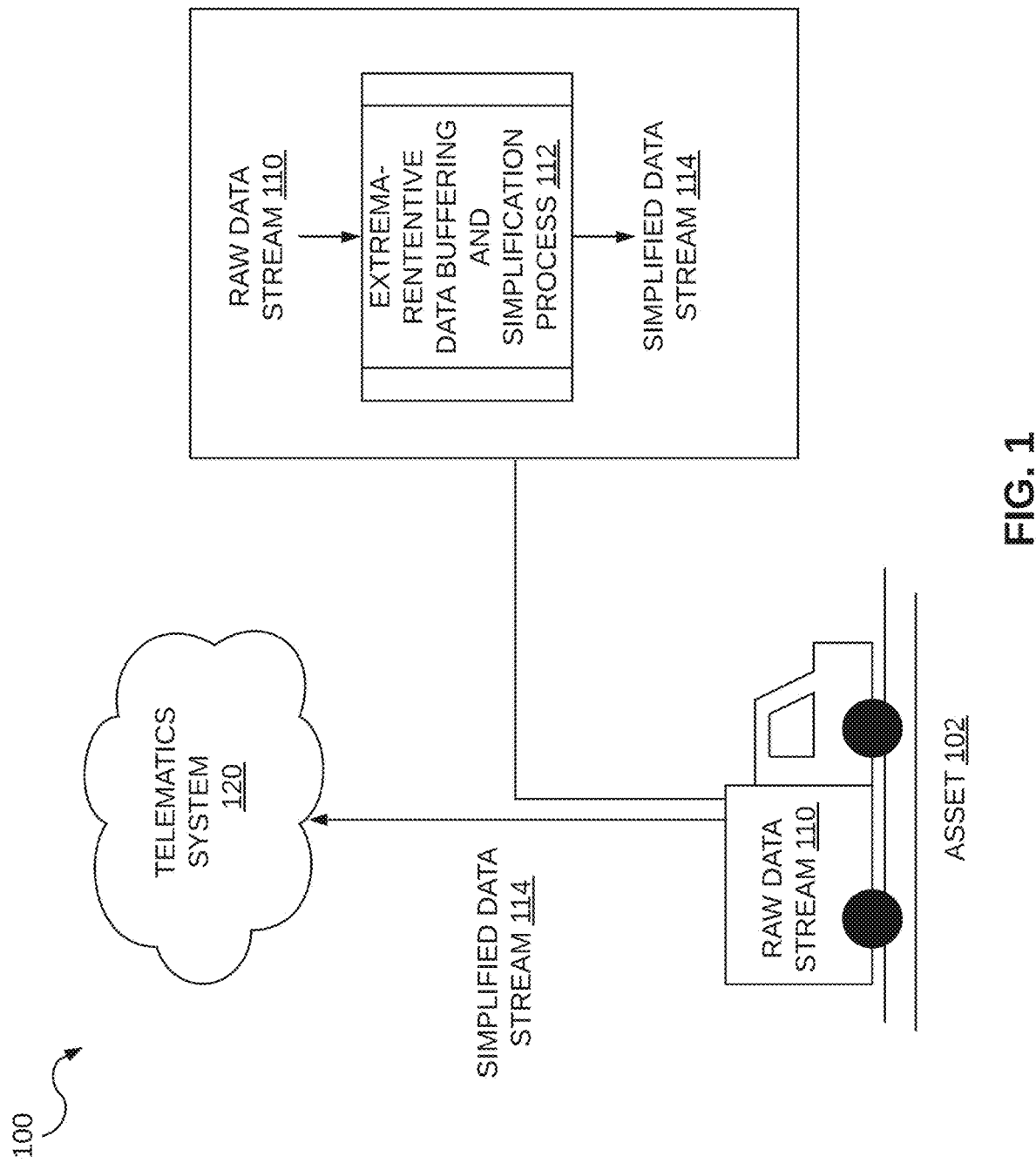
FIG. 1 is a schematic diagram of an example system for asset tracking that involves an extrema-retentive data buffering and simplification process.

Telematics systems tend to track very high numbers of assets, and each of these assets could potentially produce a very large quantity of data to be tracked. Therefore, to avoid collecting inordinate amounts of data, telematics systems typically employ one or more data sampling, reduction, filtering, or simplification techniques that reduce the amount of data collected from those assets. Advanced versions of such techniques have the aim of identifying only the most operationally-salient data generated at each asset to be recorded, while discarding the remainder.

Such techniques may be applied directly at the asset level so that decisions are made as to which data points should be recorded, and which data points should be discarded, before any data is transmitted to back-end systems. For periods of time during which data points were discarded, the telematics system can estimate the status of the asset based on the nearest data points that were sent to the telematics system (e.g., by interpolation or extrapolation). In this way, a telematics system can provide an accurate picture of the state of any of its assets in real time, or at any point in the past, without unduly burdening the telematics system with excessive data transmission or data storage requirements.

With the decision as to which data points to discard being made at the asset level, there is a significant need for temporary data storage at the asset (or on asset tracking devices at the asset). This need may be met through the use of one or more data buffers that are periodically refreshed as new data is collected. A data simplification process may be performed directly on these data buffers so that the decision as to which data points are to be discarded, and which are to be recorded, can be made prior to the transmission, or more permanent storage, of the data, thereby limiting the need for, and cost of, more permanent data storage and/or data transmission.

However, as will be described in greater detail below, it has been determined that certain data points may be inadvertently overlooked by the data simplification process (i.e., not adequately considered for recordation) when a data simplification process is applied directly within a data buffer. In particular, it has been determined that certain extrema data points (i.e., global or local maxima or minima, peaks or troughs) can sometimes be inadvertently excluded from recordation when such data points occur near the transition point when a data buffer is about to be refreshed (e.g., when the data buffer is filled with a first cycle of data and is cleared in preparation to ingest a second cycle of data). These extrema data points may have otherwise been recorded had they occurred elsewhere in the buffer cycle. Extrema data points are often of particular interest in the field of telematics, as they often communicate the most salient information (e.g., the top speed of a speeding vehicle, or a lowest oil temperature on a cold winter day).

As described herein, a data buffering process and a data simplification process are combined in such a way that the efficiency of applying a data simplification process directly within a data buffer is retained without the inadvertent exclusion of those certain extrema data points from being adequately considered for recordation. This process may be referred to as an extrema-retentive data buffering and simplification process.

FIG. 1 is a schematic diagram of an example system 100 for asset tracking that involves an extrema-retentive data buffering and simplification process.

The system 100 includes an asset 102. For exemplary purposes, the asset 102 is shown as a vehicle, namely a commercial transport truck. However, the asset 102 may include any type of vehicular asset, such as a passenger vehicle, construction equipment vehicle, sporting vehicle, utility vehicle, naval vessel, aircraft, or any other vehicular asset. The asset 102 may also include any non-vehicular asset, such as a transport trailer, shipping container, pallet, shipped item, power generator, other machine, or any other non-vehicular asset.

In some examples, an asset tracking device (not shown) may be coupled to the asset 102 to track data pertaining to the asset 102. In other examples, the asset 102 may include an integrated asset tracking device that tracks data pertaining to the asset 102 directly. In still other examples, the term "asset tracking device" may describe a computer program, whether embodied in software, firmware, or a combination thereof, that resides onboard a computing device onboard the asset 102, and which performs the functions described herein. In either case, a processor/controller on the asset 102 and/or asset tracking device obtains data, such as the location of the asset 102, and other types of data, from sensors (e.g, for accelerometer data), electronic control units (ECUs) of the asset 102 (e.g., for vehicle speed data), or other data sources (e.g., GPS devices). In the case of location data, the location of the asset 102 may be obtained from a locating system such as a Global Positioning System (GPS), a Global Navigation Satellite System (GNSS), a cellular tower network, Wi-Fi networks, or another location system. In the case of sensor data, that data may be obtained from a sensor onboard the asset 102 or a sensor on an asset tracking device coupled to the asset 102, if applicable. In the case of data from an ECU, that data may be obtained from the ECU (e.g., through a Controlled Area Network (CAN) bus) or, if an asset tracking device is coupled to the asset, through a communication port such as an onboard diagnostic port (e.g., OBD2 port) of the asset 102. Any of the above sources of data may be referred to as a data source. Such data is typically collected in a stream in real-time, and thus the data collected from such a data source is indicated generally as raw data stream 110.

The raw data stream 110 may contain data that has passed through one or more pre-filtering steps, such as, for example, a low-pass filter, and may also contain data that has not passed through any such pre-filtering steps. Thus, although the term "raw data" is used, it is to be understood that such data refers to any data that is fed into the extrema-retentive data buffering and simplification process 112.

The system 100 further includes a telematics system 120 with back-end data collection systems to record data captured from the asset 102 and other assets, including location data, trip/travel histories, accelerometer data, vehicle speed data, engine data, and other data pertaining to the assets it tracks. The telematics system 120 may further store user accounts and other data associated with the assets and/or asset tracking devices for the provision of telematics services. The telematics system 120 includes one or more servers or computing devices to store such data and to provide a telematics service and/or data analysis based on the recorded data. In particular, the telematics system 120 includes at least one server with a communication interface to communicate with the asset 102 (directly or through an asset tracking device coupled to the asset 102, if applicable) via one or more computing networks and/or telecommunication networks, a memory to store data and programming instructions, and a controller to execute the methods performed by the telematics system 120 as described herein. The telematics system 120 may provide a telematics service, including live tracking, record keeping, and reporting services to end user (client) devices, and may further store or forward the data collected from the asset 102 and other assets to other systems for further analytics purposes.

Only a small portion of the data in the raw data stream 110 that is collected at the asset 102 is ultimately transmitted to the telematics system 120. The remainder of the raw data is discarded as being redundant or not sufficiently operationally-salient for the purposes of the telematics system 120. Raw data from the raw data stream 110 is buffered at the asset (or at an asset tracking device thereon) and periodically (or aperiodically) simplified, in what is described herein as an extrema-retentive data buffering and simplification process 112. By application of the process 112, a simplified data stream 114 is produced, which is ultimately transmitted to the telematics system 120.

The extrema-retentive data buffering and simplification process 112 is described in greater detail throughout this description. However, for illustrative purposes, attention is next directed toward FIGS. 2-3C, where some of the shortcomings of non-extrema-retentive processes are explained.

Figure 2:
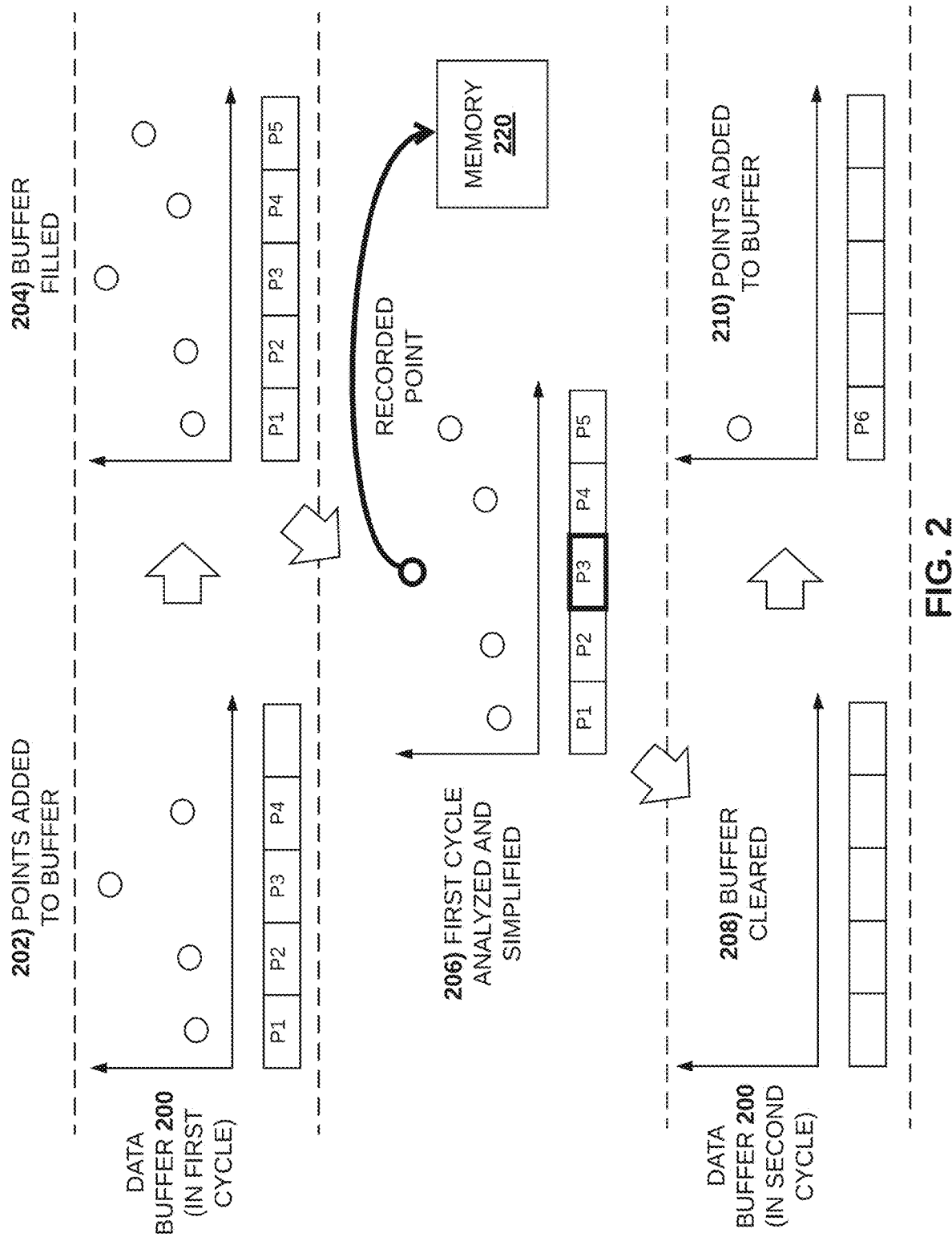
FIG. 2 illustrates the application of a data buffering and simplification process to a data buffer as the data buffer is filled with a series of data points.

FIG. 2 illustrates the application of a data buffering and simplification process to a data buffer 200 as the data buffer 200 is filled with a series of data points. The process shown may suffer from the issues described above with respect to certain extrema data points being improperly missed by the application of a dataset simplification algorithm.

In the example shown, the data buffer 200 provides space for five data points to be temporarily stored. At step 202, the data buffer 200 is in its first "cycle" of data. The term "first" used herein does not necessarily refer to the initial cycle of data that fills the data buffer 200 before any other, but rather, refers to the first of any pair of adjacent cycles of data (potentially after several cycles of operation of the data buffer 200). Here, four data points, P1, P2, P3, and P4, are stored in the data buffer 200, leaving space for a fifth data point to be added. These data points may represent any sort of data pertaining to an asset that may be collected by a telematics system, including any property, state, or operating condition of a vehicle, such as, for example, GPS latitude, GPS longitude, altitude, vehicle speed, engine speed, accelerometer X magnitude, accelerometer Y magnitude, accelerometer Z magnitude, oil pressure, battery temperature, battery voltage, etc. The value of each data point is shown plotted on a data-time plot above the data buffer 200 (with units and axis labels omitted for clarity) to illustrate that the collected data is changing over time. The data points are added chronologically to the data buffer 200 from left to right, with each data point being plotted approximately above its respective slot in the data buffer 200.

At step 204, a fifth point, P5, is added to the data buffer 200, which is now completely filled. With the data buffer 200 filled, the application of a dataset simplification algorithm to the data buffer 200 is triggered, at step 206. The dataset simplification algorithm determines, in this case, that point P3 (highlighted in bold) is to be recorded into memory 220. Data points that are recorded in the memory 220 are designated to be transmitted to a telematics system.

At step 208, with the relevant data points from the first cycle of data recorded (i.e., point P3), the data buffer 200 is prepared for the next cycle of data (i.e., the second cycle of data). Preparing the data buffer 200 for the next cycle of data may involve clearing, refreshing, or emptying the data buffer 200 of any existing data points. That is, any data points remaining in the data buffer 200 that are not stored in memory 220 are discarded (i.e., deleted or overwritten).

At step 210, new data points are added to the data buffer 200, beginning with data point P6, to start the next cycle of data. New data points may continually be added in this way until another dataset simplification algorithm is triggered. These new data points will similarly either be recorded in memory 220 (for transmission to a telematics system) or discarded.

In this way, large quantities of data may be collected at an asset and analyzed for relevance (by a dataset simplification algorithm) so that only the operationally-salient data points are transmitted to the telematics system. Several threads of the process described herein may run in parallel for different sets of data. For example, separate data buffers 200 may be designated for GPS data, accelerometer data, or other vehicle data, and each of these separate data buffers 200 may be subject to the real-time buffering and simplification process described above.

Figure 3A:
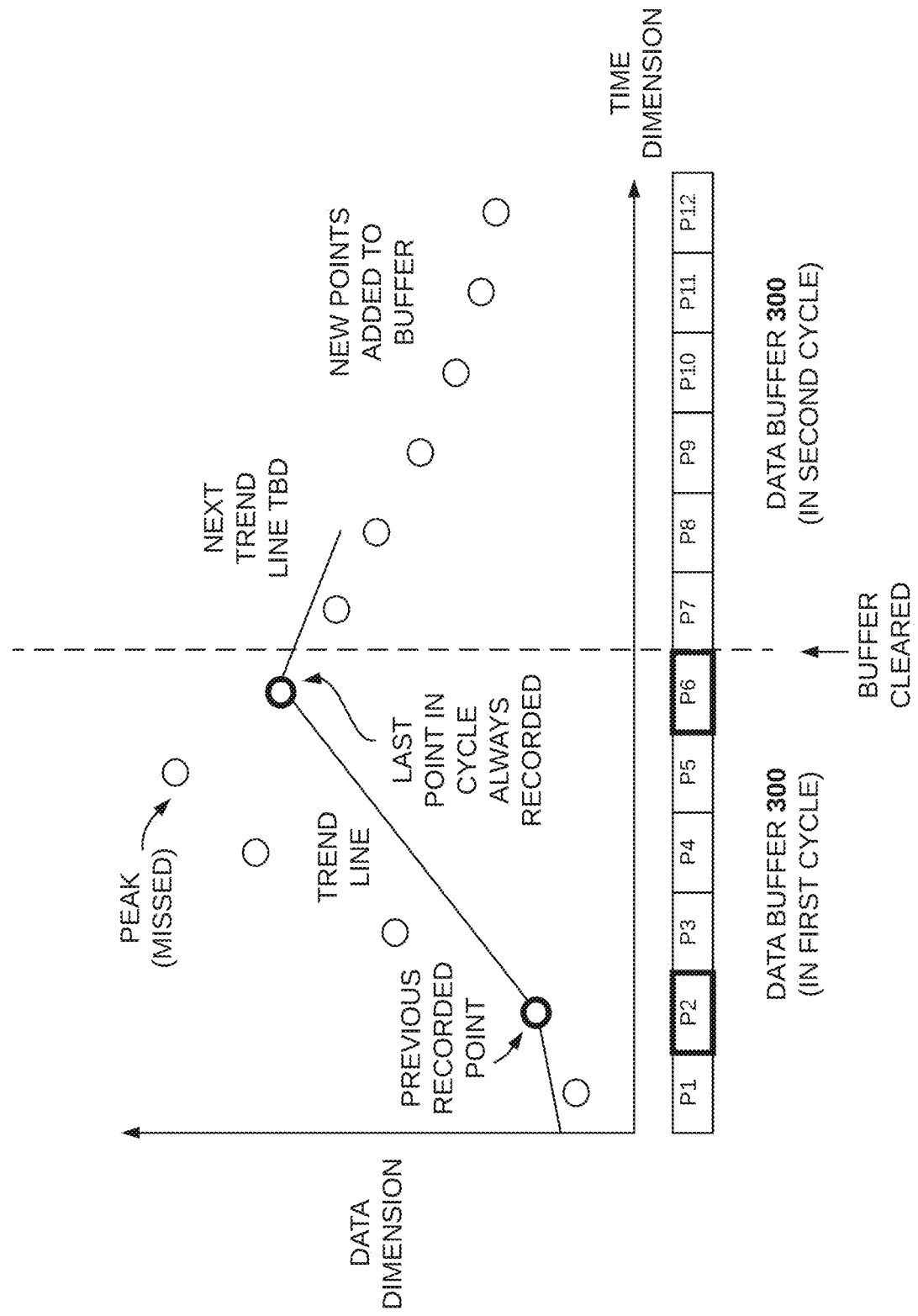
FIG. 3A shows an example data-time plot of a series of data points being added to a data buffer, and further shows the application of a data buffering and simplification process to the data buffer, whereby an extrema (e.g., peak) data point in the first cycle of data is missed by the data buffering and simplification process as the data buffer transitions from a first cycle of data to a second cycle of data.
Figure 3B:
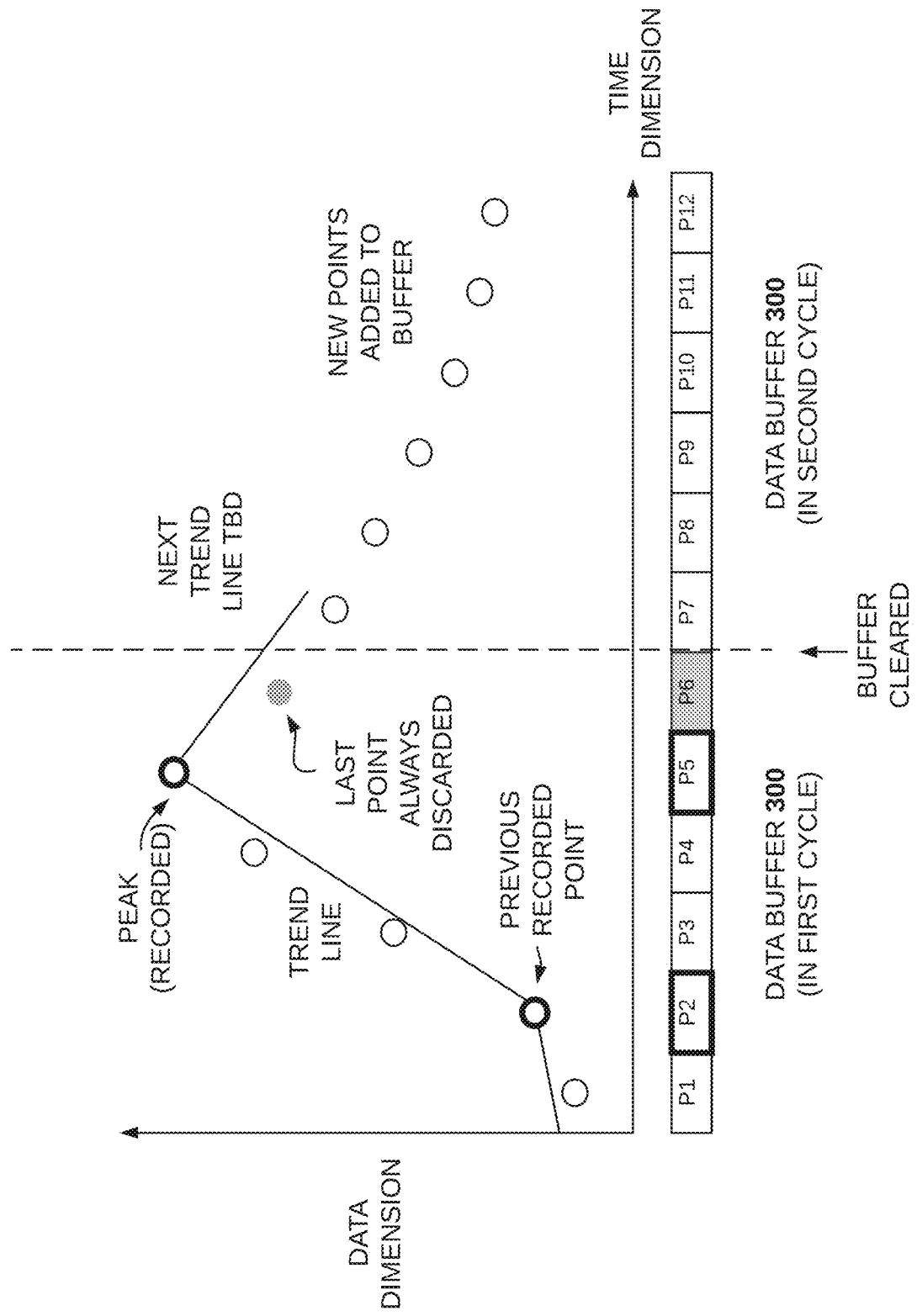
FIG. 3B shows another example data-time plot of a series of data points being added to a data buffer, and further shows the application of a data buffering and simplification process to the data buffer, wherein the last data point in the first cycle of data is discarded as the data buffer transitions from a first cycle of data to a second cycle of data.
Figure 3C:
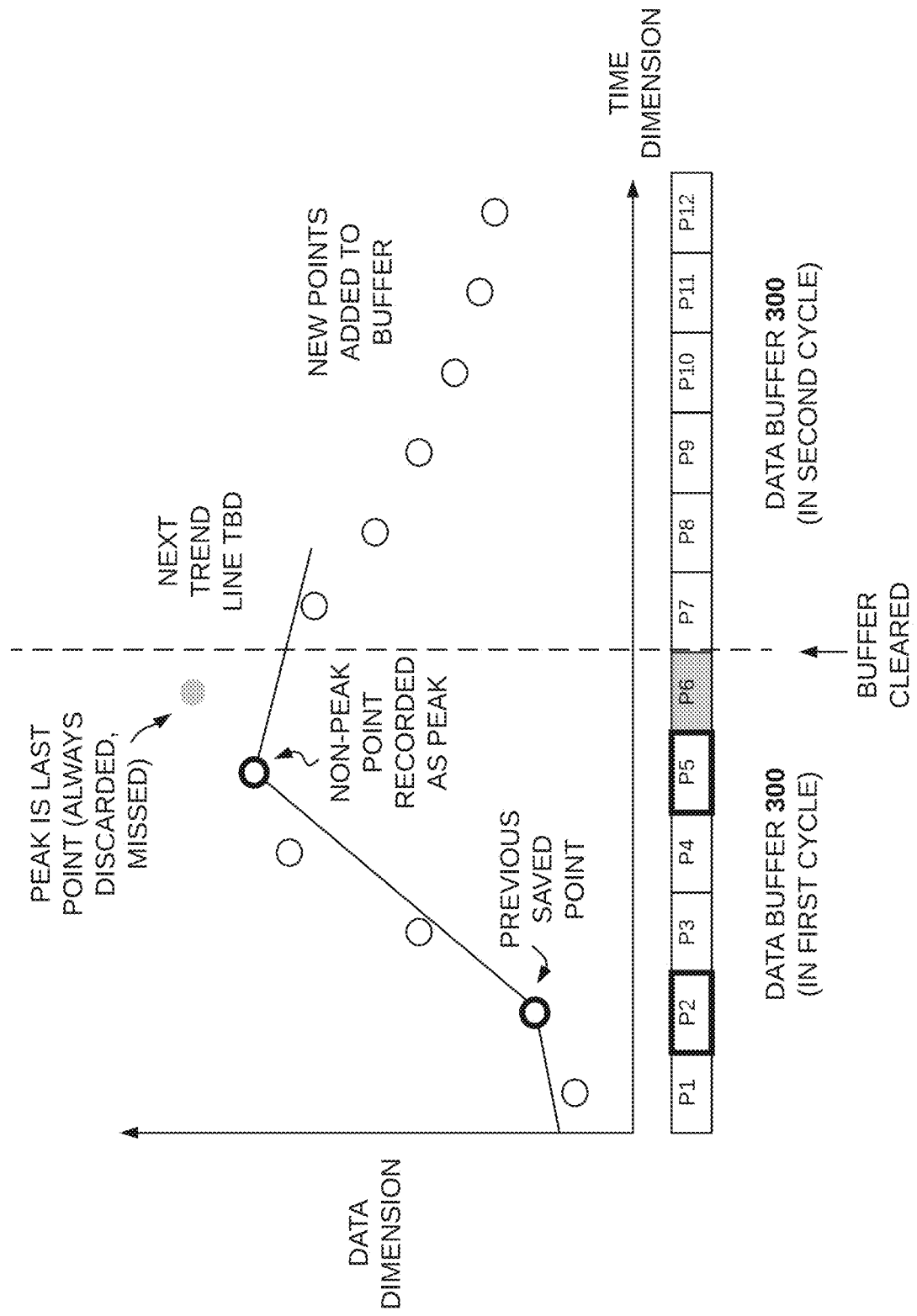
FIG. 3C shows yet another example data-time plot of yet another series of data points being added to a data buffer, and further shows the application of a data buffering and simplification process to the data buffer, whereby yet another extrema (e.g., peak) data point in the first cycle of data is missed by the data buffering and simplification process as the data buffer transitions from a first cycle of data to a second cycle of data.

Although this process makes efficient use of memory and data transmission resources, this process may be at risk of certain shortcomings, as will be seen below. As shown in FIGS. 3A-3C, certain extrema data points may be missed near the edges of a set of data when a dataset simplification algorithm is applied to a data buffer when the data buffer transitions from a first cycle of data to a second cycle of data.

FIG. 3A shows an example data-time plot of a series of data points being added to a data buffer 300, and further shows the application of a data buffering and simplification process to the data buffer 300 as the data buffer 300 transitions from a first cycle of data to a second cycle of data.

The data buffer 300 provides space for a number of data points to be temporarily stored (including at least the six data points shown), which may represent any sort of data pertaining to an asset that may be collected by a telematics system. The value of each data point is shown plotted on a data-time plot above the data buffer 300 (with units omitted for clarity) to illustrate that the collected data is changing over time, chronologically, from left to right, with each data point being plotted approximately above its respective slot in the data buffer 300.

Any number of data points may have been added to the data buffer 300 prior to the addition of data point P1. After data point P6 is added, the data buffer 300 is filled, a dataset simplification algorithm is triggered, and the data buffer 300 is cleared in preparation for new data points to be added in a second cycle of data. The dataset simplification algorithm is applied on points P1-P6 and any earlier points added to the data buffer 300. In the example shown, the particular kind of dataset simplification algorithm that is applied is a direct (unmodified) application of the Ramer-Douglas-Peucker (RDP) algorithm, an iterative process in which a curve of data is simplified into a similar curve composed of fewer points, within a certain margin of error (i.e., an allowable error threshold). However, the process could be illustrated with other curve simplification algorithms (path simplification algorithms) that directly simplify a set of data. Direct application of the RDP algorithm results in the recordation of the first point in the data buffer 300 (not shown), the last point in the data buffer (P6), and any significant data points between the first and last points that fall outside of a predefined margin of error (in this case, P2). Thus, data points P2 and P6 are highlighted in bold to indicate that they have been flagged to be recorded and transmitted to the telematics system. A trend line is defined between the points recorded from the first cycle of data (i.e., points P2 and P6), and remains to be defined in the second cycle of data after a dataset simplification algorithm is applied in that cycle of data.

However, it should be noted that the highest data point in the first cycle (P5) was not recorded. This is because, despite P5 being the highest point in the dataset, it occurred near a point that was forcibly recorded by the RDP algorithm (namely, the last point in the dataset, P6), and therefore would not be recorded unless it fell outside the margin of error between the last point in the dataset and the previous recorded point. Rather, P6 is erroneously recorded as the "peak" data point in the curve.

Although it is one of the goals of the RDP algorithm to filter out data points that lie within the margin of error between two neighbouring points, there is a bias in the RDP algorithm against saving peak points that occur near the first and last points in the dataset. The RDP algorithm typically saves the first and last points in a set of data, and then evaluates the contribution of each of the interior points toward the overall shape of the data. Since the first and last points are automatically saved, other points that appear near these first or last points are less to have an impact on the overall shape of the curve, and therefore are less likely to be saved. This is a problem when these points actually represent the peaks (or troughs) in a larger set of data. This is particularly a problem when data is stored temporarily in a buffer prior to simplification. For example, a data point that is situated near the end of a buffer may be a peak data point if viewed in the greater context of the current buffer plus the immediately following buffer, but this data point may be discarded (i.e., "missed") because it did not have a significant impact on the overall shape of the first buffer. In other words, there is a bias in the RDP algorithm that is expected to cause a significant proportion of peak data points to be prematurely determined to be missed merely for being collected near the beginning or end of the data buffer 300. Similar biases may be present in other curve/path simplification algorithms.

Extrema data points (peaks or troughs) are of particular interest in telematics data, and therefore there is a significant advantage to be attained by ensuring that these points are captured. For example, it may be of particular interest to record the highest speed that a speeding vehicle is travelling, regardless of whether those highest speed points fall within a margin of error of a dataset simplification algorithm.

Although the issue described here results from application of the RDP algorithm, it is expected that the same issue will be observed upon the application of any sort of dataset simplification algorithm that forces the first or last data point in a dataset to always be recorded. Similar issues may be applicable in other curve simplification or path simplification techniques. Techniques to avoid this bias against capturing extrema points that are found near the end of the data buffer 300 are proposed herein, including in FIG. 3B, below.

FIG. 3B shows another example data-time plot of the same series of data points being added to the data buffer 300. However, in contrast to the data buffering and simplification process described in FIG. 3A, in FIG. 3B, the last data point added to the data buffer 300 (P6) is always excluded from consideration for recordation (shown in grey). Further, the last data point in the data buffer 300 is always discarded. Thus, since P6 is excluded from consideration, in this case, P5 is now identified by the dataset simplification algorithm as point worth recording (shown in bold), and thus the peak point is successfully captured. Application of this strategy therefore avoids the specific edge case shown in FIG. 3A in which a peak point near the last point in the data buffer 300 is missed.

FIG. 3C shows another example data-time plot of yet a series of data points being added to the data buffer 300. In this case, as in FIG. 3B, the last data point added to the data buffer 300 is always excluded from consideration for recordation (P6). However, in this case, the last data point added to the data buffer 300 is itself the peak point. Under application of the RDP algorithm, the non-peak point, P5, is erroneously recorded as the "peak" data point. Thus, it can be seen that the strategy employed in FIG. 3B introduces a new bias in which a peak point is missed if that peak point is itself the last data point added to the data buffer 300.

Thus, there exists a need for a data buffering and simplification process that ensures that extrema data points (peaks and troughs) are captured without biases against extrema data points that occur near the transition of a data buffer from one cycle to the next. The present disclosure proposes such a process, referred to herein as an extrema-retentive data buffering and simplification process.

Figure 4:
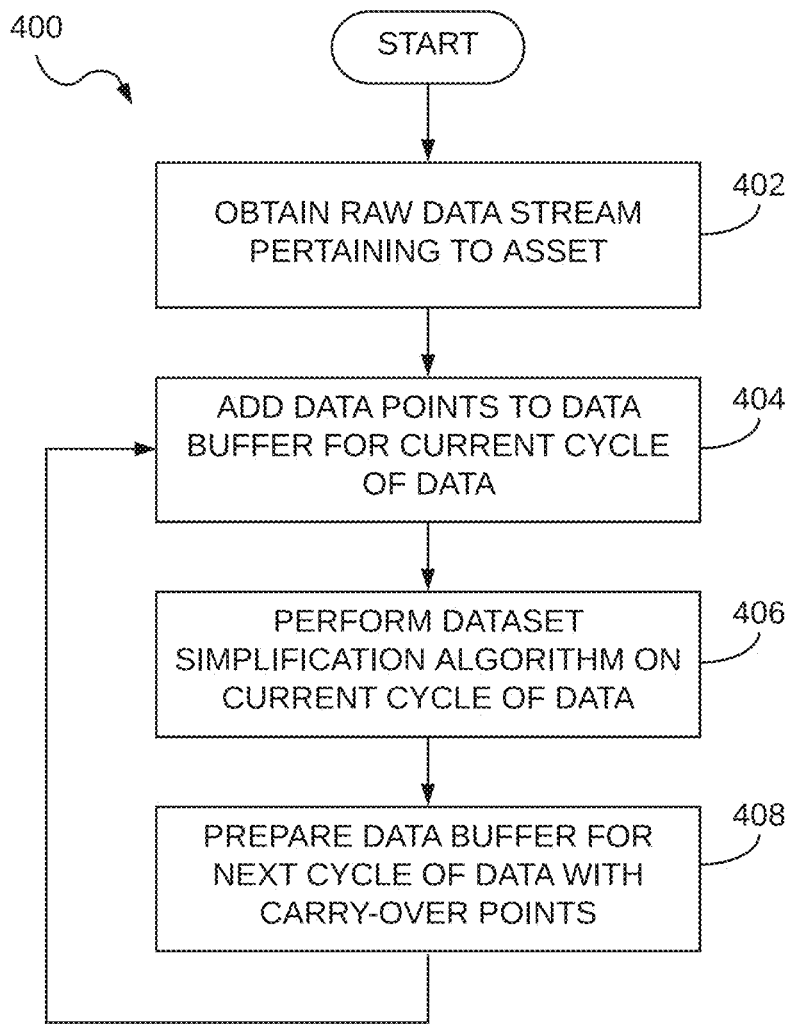
FIG. 4 is a flowchart of an example method for asset tracking in accordance with an extrema-retentive data buffering and simplification process.

FIG. 4 is a flowchart of an example method 400 for asset tracking in accordance with an example extrema-retentive data buffering and simplification process. The method 400 may be understood to be one example of the extrema-retentive data buffering and simplification process 112 of FIG. 1, and it is to be understood that the blocks of the method 400 may be performed by an integrated tracking device onboard the asset 102 of FIG. 1 or an asset tracking device coupled to the asset 102. For greater clarity, the method 400 is described with reference to FIG. 5, which illustrates the functional elements involved in an extrema-retentive data buffering and simplification process 500, which may be similar to the process 112 of FIG. 1, in a manner that shows the flow of data points through the process. Thus, attention is directed to FIG. 4 and FIG. 5 simultaneously.

Figure 5:
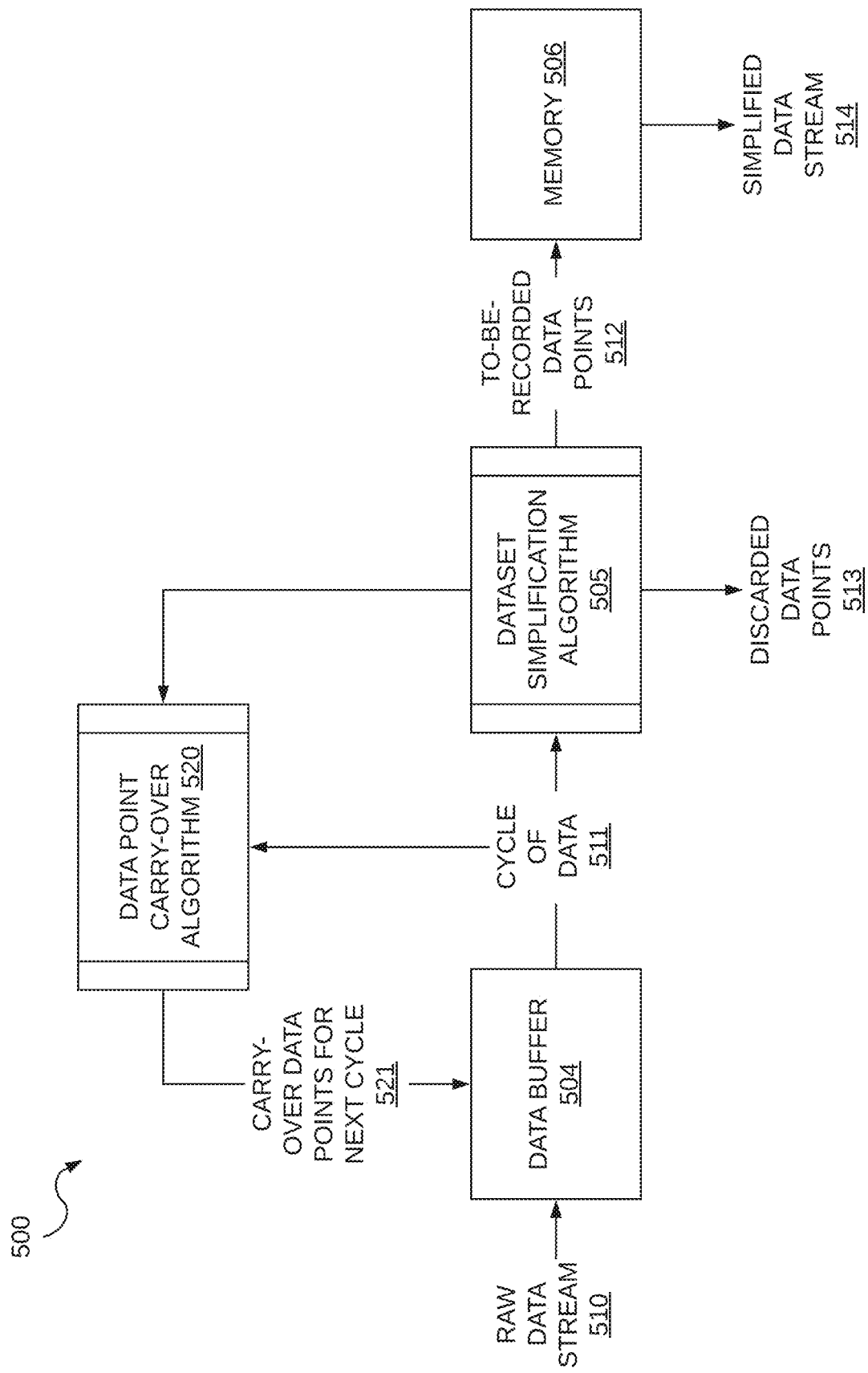
FIG. 5 is a schematic diagram of the functional elements involved in an example extrema-retentive data buffering and simplification process that shows the flow of data points through the process.

In FIG. 5, the data buffer 504 and the memory 506 may refer to different portions of memory onboard an integrated tracking system or asset tracking device that tracks an asset, such as the asset 102 of FIG. 1. The dataset simplification algorithm 505 and data point carry-over algorithm 520 are algorithms that may be executed by a controller (e.g., processor) of such an integrated tracking system or asset tracking device. Similarly the raw data stream 510 may be similar to the raw data stream 110 of FIG. 1, and the simplified data stream 514 may be similar to the simplified data stream 114 of FIG. 1.

Referring now to FIG. 4 and FIG. 5 together, at block 402, the raw data stream 510 pertaining to an asset is obtained. The stream of raw data may be obtained from a data source onboard the asset, which may include an electronic control unit (ECU) of the asset or a sensor onboard the asset. Such data may be obtained directly, through a Controlled Area Network (CAN), or through a communication port (e.g., OBD2 port) if the data is obtained by an asset tracking device coupled to the asset. In cases where the asset is a vehicle, the raw data may describe a property, state, or operating condition of the vehicle (e.g., outside temperature, accelerometer data, GPS data, engine speed, etc., as described above).

At block 404, data points from the raw data stream 510 are added to the data buffer 504 in the first cycle of data 511 (i.e., the current cycle of data). In other words, data points from the raw data stream 510 are batched or grouped together into small chunks for the determination of whether any of such data points are to be recorded. The data points are added to the data buffer 504 chronologically, and in real-time, as the data is obtained.

At block 406, a dataset simplification algorithm 505 is performed on the first cycle of data 511 to determine whether one or more data points from the first cycle of data 511 are to be recorded (i.e., as simplified data, or in a simplified set of data) shown as to-be-recorded data points 512. The unrecorded data points are discarded, shown as discarded data points 513. The recorded data points 512 (the points in the simplified data) are ultimately transmitted as a simplified data stream 514 to a telematics system.

The dataset simplification algorithm that is applied may be the Ramer-Douglas-Peucker (RDP) algorithm, or a variation thereof (or another curve simplification or path simplification algorithm). The RDP algorithm is an iterative process in which a curve of data is simplified into a similar curve composed of fewer points, within a certain margin of error (i.e., an allowable error threshold). Briefly described, the RDP algorithm, and variations thereof, involve comparing, against a threshold value (i.e., an allowable error threshold), the distance of each data point under evaluation to a particular reference line to make a determination as to how significant that data point is to the overall trend of the data, and therefore whether it should be recorded. In the RDP algorithm, and variations thereof, each data point is measured against a reference line joining the two nearest data points on either side of that data point that are already determined to be recorded, beginning with the first and last points in the set of data. If a data point deviates from the relevant reference line in excess of the allowable error threshold, and in a greater proportion than any of its neighboring data points that are also being compared against the same reference line, then that data point is recorded. Beginning with a reference line defined between the first and last points in the set of data, the point with the greatest error from that reference line is recorded, and two new reference lines are defined: a first reference line between the first point and the to-be-recorded point, and a second reference line between the to-be-recorded point and the last point. The process carries forward iteratively, on each newly defined reference line, until no points deviate from their relevant reference lines in excess of the threshold error value. The distance between a data point and its reference line may be measured directly (i.e., the shortest distance), as per the RDP algorithm, or in some cases, as a "vertical" distance (in the data dimension), or even as a "horizontal" distance (in the time dimension, if applicable), in variations of the RDP algorithm. As described herein, the last data point in the set of data is not necessarily saved, as it is often carried-over to the next cycle of the data buffer for further evaluation, and further, the first data point in the set of data is often a previously recorded point, the recordation of which is not duplicated.

In some examples, the dataset simplification algorithm 505 may be triggered periodically. In other examples, rather than being performed strictly periodically, the dataset simplification algorithm may be performed upon satisfaction of a data logging trigger. A data logging trigger being satisfied may include, for example, the data buffer being filled, a timer expiring, or when a more advanced aperiodic trigger is satisfied. An example of an aperiodic trigger is one which is satisfied when any given condition is met in the raw data. For example, an aperiodic trigger may be satisfied when a particular type of data being collected exceeds a threshold value (e.g., a dataset simplification algorithm is triggered when a vehicle is determined to be travelling in excess of 100 km/h). Another example of an aperiodic trigger is one which is satisfied when there appears to be a significant change in the raw data being collected. For example, an aperiodic trigger may be satisfied when a data point obtained from the raw data stream 510 deviates from an expected range in excess of a threshold amount. For example, when GPS data shows that the asset has travelled outside of its expected trajectory (based on previously recorded GPS data points), a dataset simplification algorithm may be triggered. Thus, a data logging trigger may be satisfied before the data buffer 504 is completely filled. Further, any number of data logging triggers, whether periodic or aperiodic, may be checked in parallel.

In some examples, the dataset simplification algorithm 505 may be performed each time a new data point is added to the data buffer 504 from the stream of raw data 510. Thus, each time a new data point is obtained, that new data point may be immediately evaluated, with the benefit of the context provided by carry-over data points 521, to determine whether that new data point is worth saving. In such examples, depending on the size of the data buffer 504, it can be expected that the dataset simplification algorithm 505 will have been performed several times by the time the data buffer 504 becomes filled. Such a process may be particularly well suited toward identifying extrema data points quickly, once they are added to the data buffer 504, without the dataset simplification algorithm 505 being biased by a long series of data points following an extrema data point.

At block 408, the data buffer 504 is prepared for a second cycle of data. Preparing the data buffer 504 for the second cycle of data involves the data point carry-over algorithm 520 determining a group of carry-over data points 521 (i.e., a dynamic group of carry-over data points) to be included in the second cycle of data, and pre-filling the data buffer 504 with that group of carry-over data points 521 (i.e., adding the carry-over data points 521 to the data buffer 504 after the data buffer 504 being cleared, or retaining the carry-over data points 521 in the data buffer 504 without the entire data buffer 504 being cleared). The group of carry-over data points 521 may be selected from one or more of: the first cycle of data 511 (i.e., the immediately previous cycle of raw data), and an earlier cycle of data. These data points are retained from these earlier cycles of data to be carried over to the second cycle of data. That is, the carry-over data points 521 include data points from either the first cycle of data 511, an earlier cycle of data, or both. In some cases, the carry-over data points 521 may include data points selected for recordation from the results of the application of the dataset simplification algorithm 505. Thus, most often, when the dataset simplification algorithm 505 is performed on a set of data, that set of data contains new raw data points from the raw data stream 510 along with a group of carry-over data points 521. The data points that are selected to be recorded may be from the new batch of raw data points from the raw data stream 510 or from the carry-over data points 521, if not already recorded.

In the present example, the carry-over data points 521 include, at minimum, the last (or latest) data point added to the first cycle of data 511 (that is, the last data point in the data buffer 504 if the data buffer 504 is filled, or, if the data buffer 504 is not filled, the most recently added point), and one previously recorded point. That previously recorded point is, where it is determined that one or more data points from the first cycle of data are to be recorded, the last (or latest) data point determined to be recorded from the first cycle of data 511. Otherwise, where no data points are recorded from the first cycle of data 511, that previously recorded point is the last (or latest) recorded data point from an earlier cycle of data. In either case, in the present example, the data point that was most recently identified as to-be-recorded is included as a carry-over data point 521.

Carrying over the last data point added to the first cycle of data 511 maintains an amount of continuity between adjacent data buffer cycles and ensures that the point is not missed if that point happens to be an extrema data point (e.g., the circumstance that led to the missed "peak" point in FIG. 3C). Carrying over the most recently recorded or to-be-recorded data point also maintains an amount of continuity between adjacent data buffer cycles to help ensure that any new data points that are to be considered for recordation are considered in the context of the most recently recorded data. That is, carrying over the most recently recorded or to-be-recorded data point helps ensure that new data points are not unnecessarily recorded unless they deviate significantly from that point, and thereby adds an amount of smoothing to the data recordation process.

In some examples, the carry-over data points 521 further include a point between the last point added and the last point determined to be recorded that deviates the most from a reference line (i.e., a trend line) defined through (a) the last point added and (b) the last point recorded or determined to be recorded, as the case may be. In other words, the carry-over data points 521 may include the point with the "greatest error" or the greatest deviance from the two other points that are being carried over. This "greatest error" data point may be measured against the reference line according to its shortest distance to the reference line (e.g., as per the RDP algorithm), its vertical distance to the reference line, its horizontal distance to the reference line, or by another calculation. When there is a "tie" for determining which of any set of points is the "greatest error" data point with respect to any given reference line, it may be determined that the data point which occurs later in the set of data is to be selected as the "greatest error" data point, as it has been determined that a data point situated later in a set of data may be more likely to have a greater impact on how that set of data is ultimately simplified, at least in view of the considerations regarding the transition of a data buffer from one cycle to the next, as described herein.

Carrying over this "greatest error" point helps to ensure that an extrema data point that occurs near the transition between data buffer cycles is not prematurely discarded merely for being within the margin of error of the dataset simplification algorithm that is applied (e.g., the circumstance that led to the missed "peak" point in FIG. 3A). Carrying over this "greatest error" point into the next cycle allows the point to be considered in the greater context in comparison to the other data points being carried over (including the most recently recorded or to-be-recorded data point), and the newly added data points.

Thus, the first and last data points in any cycle of data (other than, in some cases, the initial cycle of data when the data buffer 504 begins operation) act as "reference" points that are considered in the analysis of the dataset simplification algorithm 505, and may or may not themselves eventually be selected by the dataset simplification algorithm 505 to be recorded. Thus, most often, the last point in any cycle of data is carried over to the next cycle of data (without necessarily being recorded in the cycle of data it was carried over from), and the first point in any cycle of data is a previously-recorded point that was carried over from a previous cycle (which need not be recorded again). Thus, the feature of the RDP algorithm that forcibly causes the first and last points of a dataset to be recorded is eliminated, along with the accompanying biases against recording extrema data points that occur near these forcibly-saved points, but the information contained in these points is still considered by the dataset simplification algorithm.

Preparing the data buffer 504 for the second cycle of data may involve, in some examples, clearing, refreshing, or emptying the data buffer 504 of any existing data points. That is, any data points remaining in the data buffer 504 that are not stored in memory 506 are discarded (i.e., deleted or overwritten). In other examples, the data buffer 504 may only be partially cleared of the data points that are not recorded, while retaining the group of carry-over data points 521. The method 400 then returns to block 404, where new data points are added to the next (i.e., second) cycle of data. These new data points are temporarily stored in the data buffer 504 along with the group of carry-over data points 521 that is determined for that cycle of data.

Thus, the data buffer 504 is not completely cleared at the start of a new cycle, but rather, is primed, or pre-populated, with certain carry-over data points 521. The group of carry-over data points 521 is dynamic, in that its composition will typically change from one cycle of data to the next, there is a new "last data point", a new "last recorded data point", and a new "greatest error" data point, to be carried over to the next cycle of data. The addition of these carry-over data points 521 to the next cycle of data provides the dataset simplification algorithm 505 with greater context to aid in the consideration of whether any of these carry-over data points 521 (and any future data points in that next cycle of data) should be recorded. That is, the dataset simplification algorithm may make the determination of whether any of these points is outside the acceptable margin of error based on a comparison to more contextually relevant data points. These benefits are illustrated by way of example in FIGS. 6-7B, below.

In some examples, a group of carry-over data points need not necessarily be stored in a data buffer along with the raw data, but may be stored in separate memory, accessible by a dataset simplification algorithm. In such examples, when the dataset simplification algorithm is applied, it is applied to the raw data in the data buffer in addition to the carry-over data points stored in separate memory.

The method 400 may be embodied in instructions stored on a non-transitory machine-readable storage medium that is executable by a processor of a computing device. Such a non-transitory machine-readable storage medium may include ROM, RAM, flash memory, magnetic storage, optical storage, and similar, or any combination thereof, for storing instructions and data as discussed herein. Thus, an example non-transitory machine-readable storage medium may comprise instructions that when executed cause one or more processors to: obtain raw data pertaining to an asset; determine a group of carry-over data points, derived from the raw data, to be used in the performance of a dataset simplification algorithm on the raw data; perform the dataset simplification algorithm on a set of data that contains the raw data and the group of carry-over data points to determine one or more data points in the set of data to be recorded; and transmit the recorded data points to the server. An example non-transitory machine-readable storage medium may further comprise instructions to perform any of the functionality of the extrema-retentive data buffering and simplification processes described herein.

Figure 6:
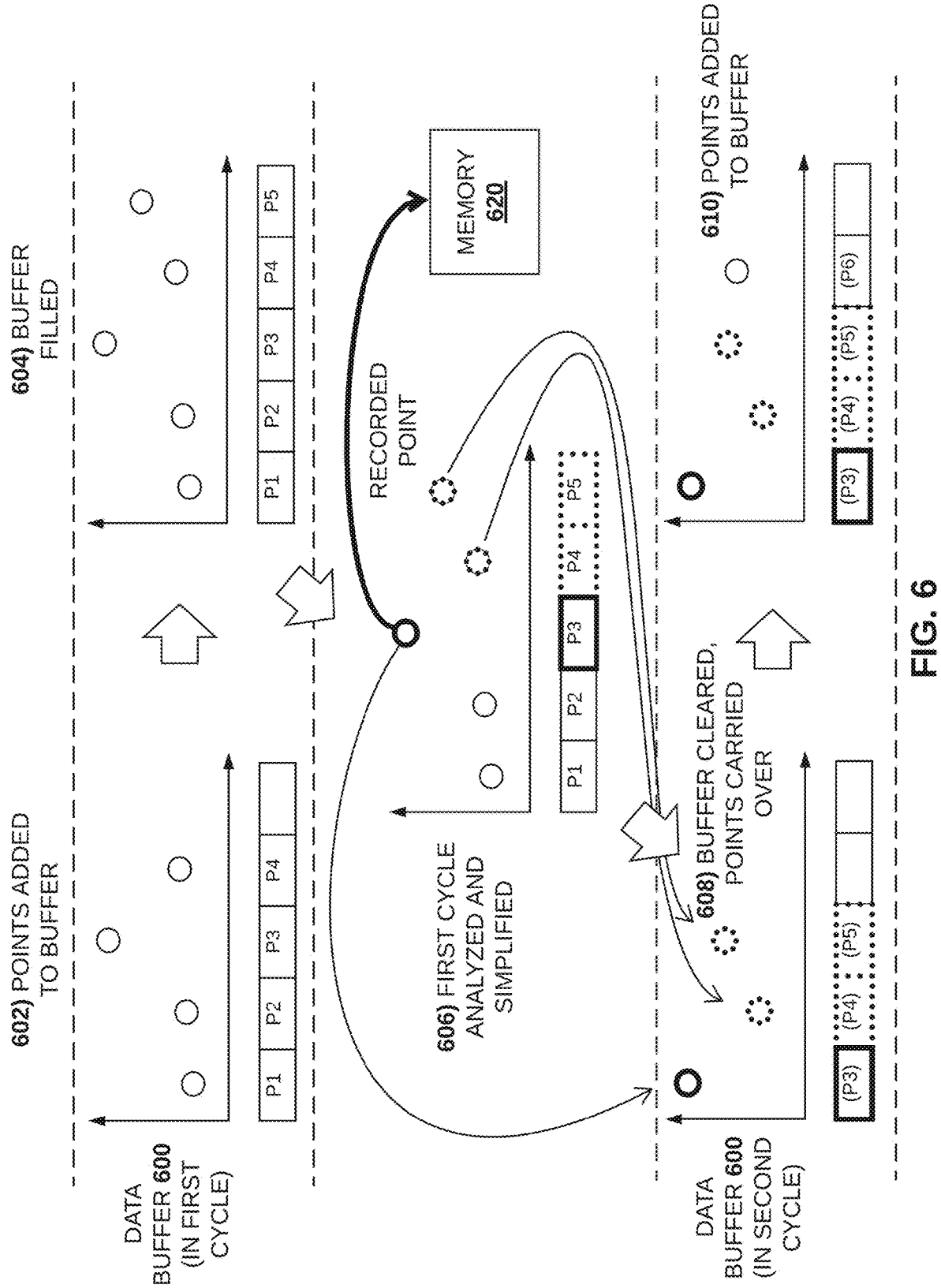
FIG. 6 illustrates the application of an example extrema-retentive data buffering and simplification process to a data buffer as the data buffer is filled with a series of data points.

FIG. 6 illustrates the application of an example extrema-retentive data buffering and simplification process to a data buffer 600 as the data buffer 600 is filled with a series of data points. The example in FIG. 6 is similar to the example shown in FIG. 2, but with the application of an extrema-retentive data buffering and simplification process as described herein. For continuity with the previous Figures, the data buffer 600 may be understood to be similar to the data buffer 504 of FIG. 5.

As in FIG. 2, in FIG. 6, the data buffer 600 provides space for five data points to be temporarily stored. At step 602, the data buffer 600 is in its first "cycle" of data. Here, four data points, P1, P2, P3, and P4, are stored in the data buffer 600, leaving space for a fifth data point to be added. The value of each data point is shown plotted on a data-time plot above the data buffer 600 (with units and axis labels omitted for clarity) to illustrate that the collected data is changing over time. The data points are added chronologically to the data buffer 600 from left to right, with each data point being plotted approximately above its respective slot in the data buffer 600.

At step 604, a fifth point, P5, is added to the data buffer 600, which is now filled. With the data buffer 600 filled, the application of a dataset simplification algorithm to the data buffer 600 is triggered, at step 606. The dataset simplification algorithm determines, for example, that point P3, highlighted in bold, is to be recorded into memory 620.

At step 608, with the relevant data points from the first cycle of data recorded (i.e., point P3), a set of carry-over data points is selected, retained (e.g., in the data buffer 600), and the remainder of the data buffer 600 is cleared (i.e., deleted, refreshed, or emptied). In the present example, the data points that are carried over from into the second cycle of data include: (i) the last data point added to the first cycle of data (i.e., P5), the last data point determined to be recorded from the first cycle of data (i.e., P3), and (iii) the point between the last point added (P5) and the last point determined to be recorded (P3) that deviates the most from a trend line defined through the last point added and the last point determined to be recorded (i.e., P4). These three carry-over data points are ordered chronologically, and occupy the first three slots for data points in the data buffer 600, leaving space for additional data points to be added to the data buffer 600.

At step 610, new data points are added to the data buffer 600, beginning with data point P6. The data points that were not recorded to the memory 620 (i.e., data points P1 and P2) are discarded (i.e., deleted or overwritten). If the carry-over data points that were not already recorded (i.e., P4 and P5) are not determined to be recorded in the second cycle of data, those points will also ultimately be discarded.

Figure 7A:
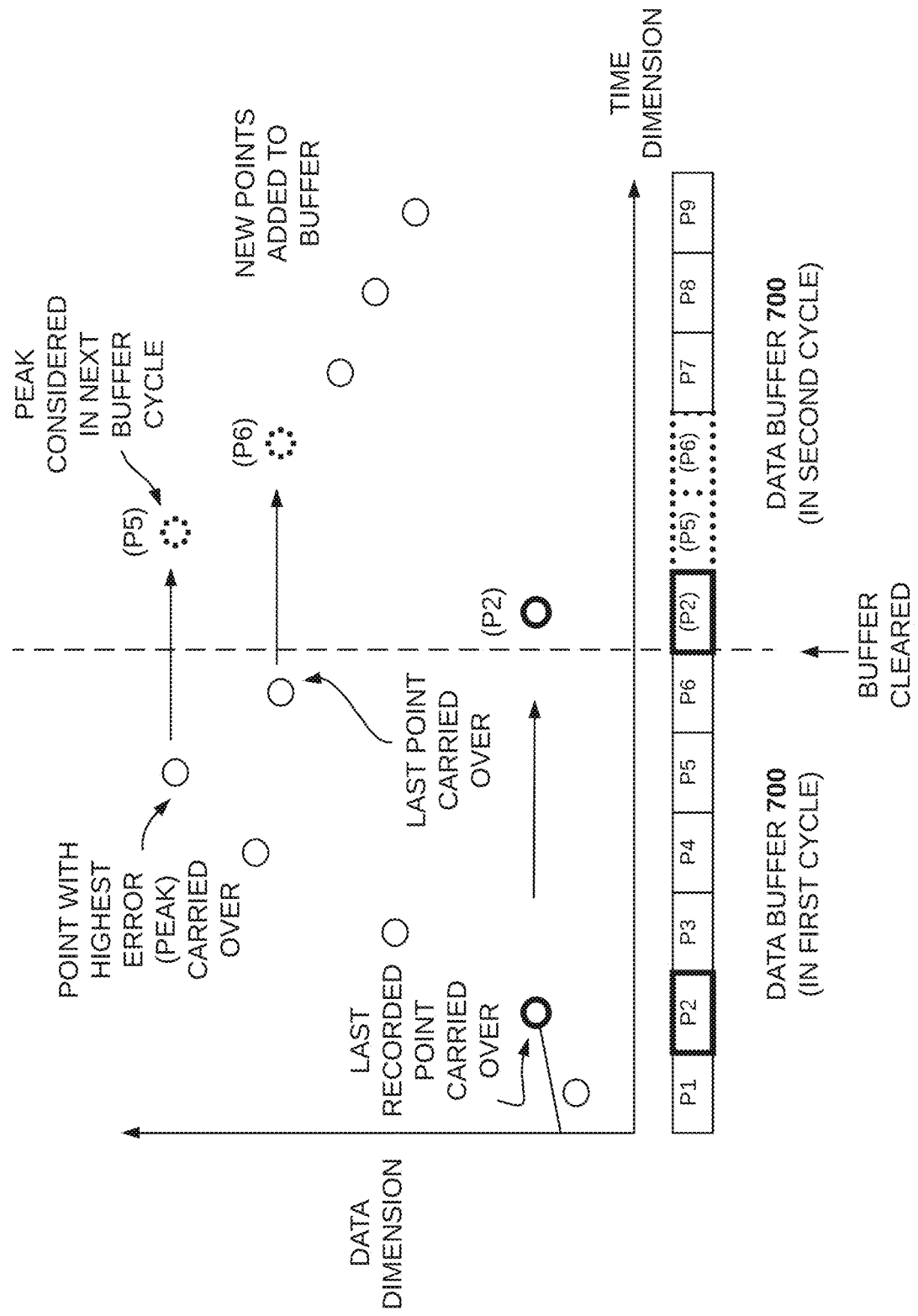
FIG. 7A shows an example data-time plot of a series of data points being added to a data buffer, and further shows the application of an extrema-retentive data buffering and simplification process to the data buffer, whereby, as the data buffer transitions from a first cycle of data to a second cycle of data, an extrema (e.g., peak) data point in the first cycle of data is retained and carried over to the second cycle of data for consideration to be recorded.
Figure 7B:
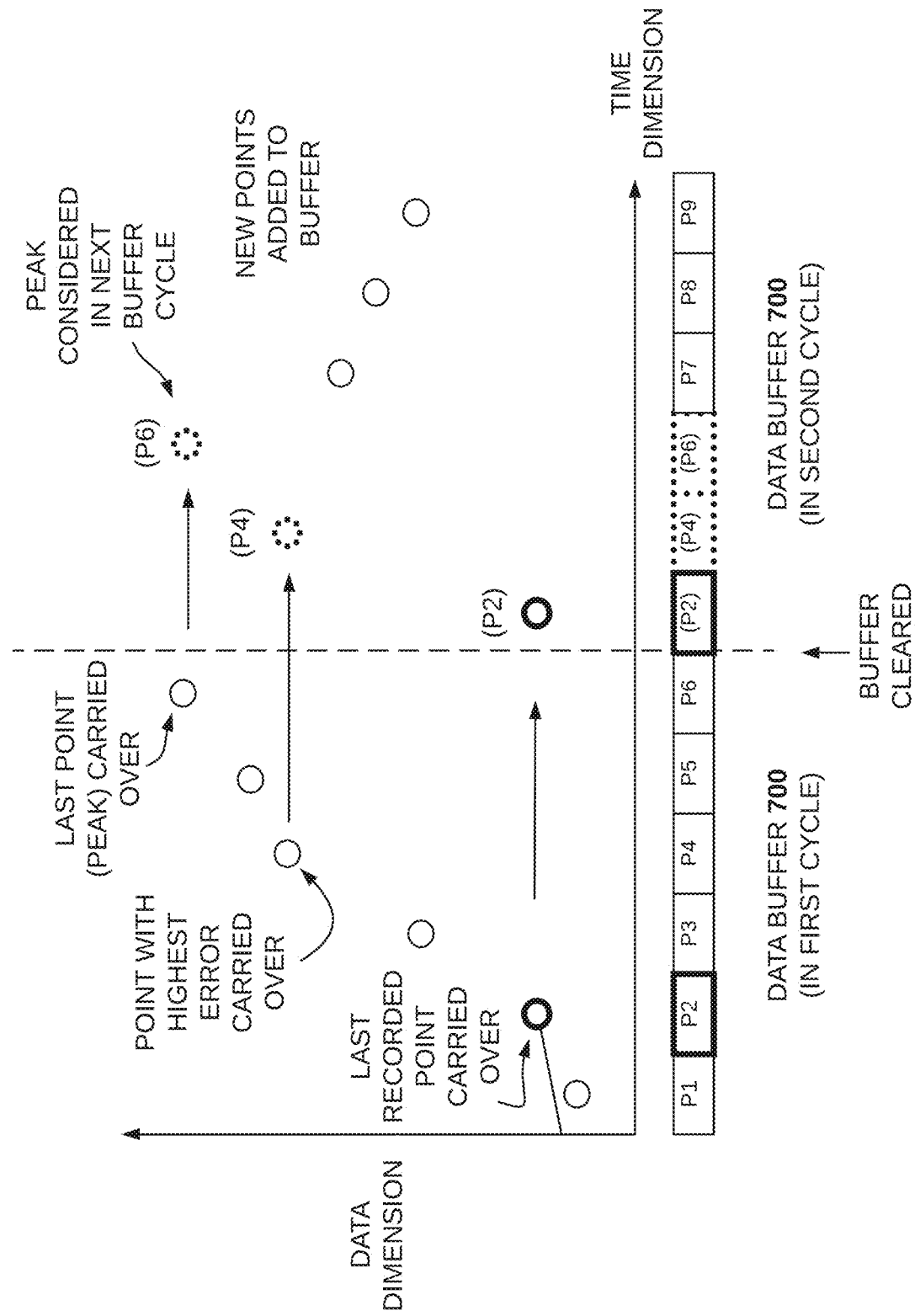
FIG. 7B shows another example data-time plot of another series of data points being added to a data buffer, and further shows the application of an extrema-retentive data buffering and simplification process to the data buffer, whereby, as the data buffer transitions from a first cycle of data to a second cycle of data, another peak data point in the first cycle of data is retained and carried over to the second cycle of data for consideration to be recorded.

Thus, the data buffer 600 is not completely cleared between cycles, but rather, is primed or pre-populated with certain carry-over data points that aid in the determination of whether any of these carry-over data points, and any further data points added to the data buffer 600, should be recorded. FIGS. 7A and 7B, shown below, show two illustrative scenarios in which the application of this data buffering and simplification process ensures that certain extrema data points (that may otherwise be missed as the data buffer 600 transitions from one cycle of data to the next) are captured.

FIG. 7A shows an example data-time plot of a series of data points being added to a data buffer 700. For continuity with the previous Figures, the data buffer 700 may be similar to the data buffer 600 of FIG. 6. Further, the series of data points being added to the data buffer 700 is identical to that shown in FIG. 3A. However, FIG. 7A shows the application of an extrema-retentive data buffering and simplification process to the data buffer 700 as the data buffer 700 transitions from a first cycle of data to a second cycle of data, thereby resulting in the capture of the peak data point that was missed in FIG. 3A.

As shown, upon application of a dataset simplification algorithm to the first cycle of data, data point P2 is determined to be recorded. However, in contrast to the algorithm applied in FIG. 3A, in FIG. 7A, the last data point (e.g., P6) is not necessarily recorded, but rather, is carried-over to the second cycle of data for further consideration. Further, the last recorded data point (P2), and the point between this last recorded point and the last point in the cycle (that is, P5), are also carried over to pre-populate the data buffer 700 in the second cycle of data. Thus, the first three slots of the data buffer 600, in the second cycle, are shown to be occupied by P2, P5, and P6, chronologically. These carry-over data points are shown in dotted lines. New data points (P7, P8, P9) are added to the data buffer 700 in the second cycle of data.

With these carry-over data points included for consideration in the second cycle of data, the biases described above (in FIGS. 3A-3C) which tend to result in certain extrema data points being missed by the dataset simplification algorithm, are avoided. As can be seen on the right-hand side of FIG. 7A, the peak data point (P5), which would have been missed by the application of an unmodified RDP algorithm if it fell within the margin of error, is very unlikely to fall within the margin of error when considered in the second cycle of data, and therefore is very likely to be recorded.

Similarly, as can be seen in FIG. 7B, where the series of data points being added to the data buffer 700 is identical to that shown in FIG. 3B, the highest data point in the first cycle (P6, which is also the last data point in the cycle), is carried over to the second cycle of data for consideration to be recorded, rather than being missed, as was the case in FIGS. 3B-3C. Similarly, as can be seen on the right-hand side of FIG. 7B, the peak data point (P6), which would have been missed by the application of an unmodified RDP algorithm if it fell within the margin of error, is very unlikely to fall within the margin of error when considered in the second cycle of data, and therefore is very likely to be recorded.

Thus, between cycles of data, the data buffer 700 is pre-populated with carry-over data points that aid in the determination of whether any of these carry-over data points, and any further data points, should be recorded.

Figure 8:
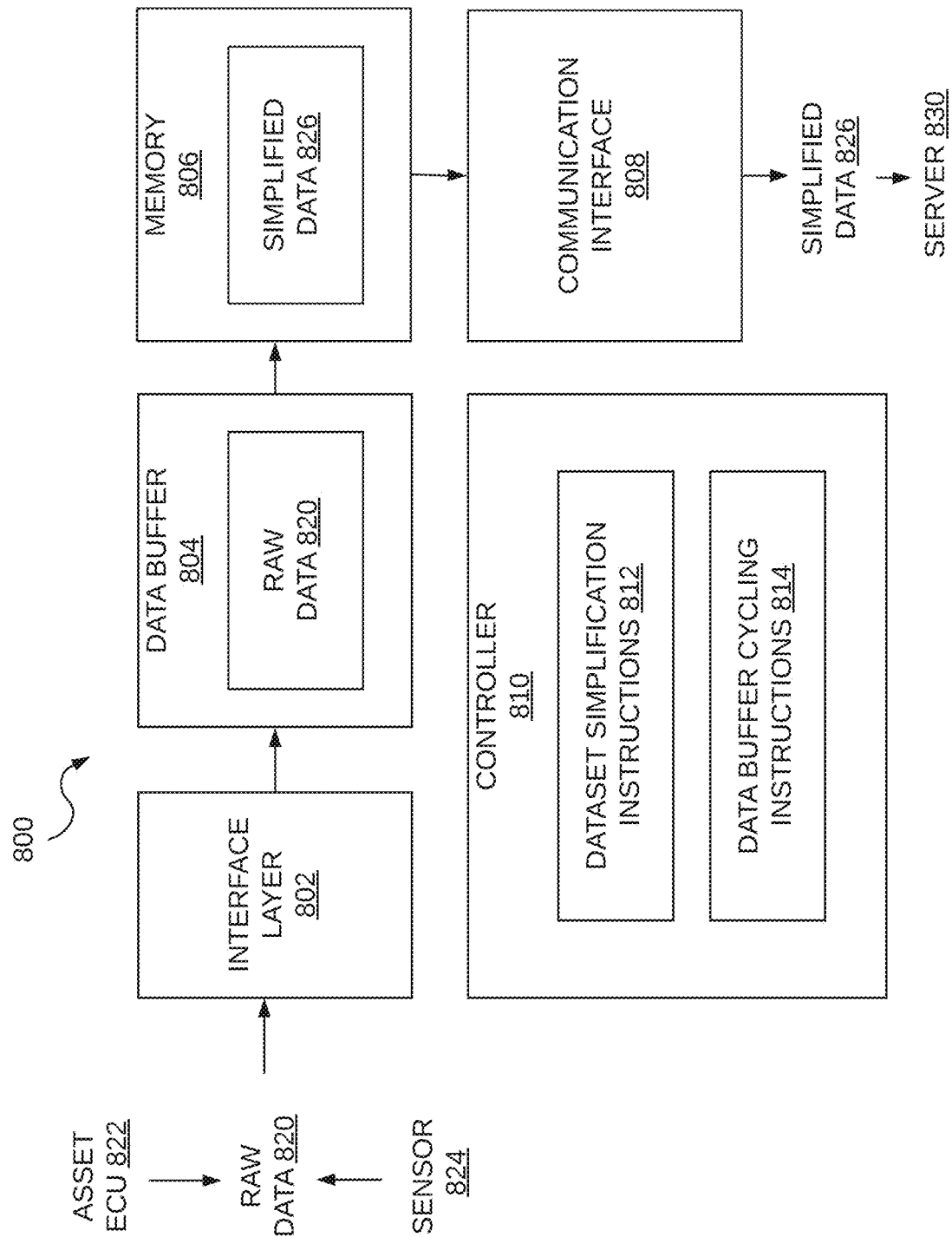
FIG. 8 is a schematic diagram of an example device for asset tracking that employs an extrema-retentive data buffering and simplification process.

FIG. 8 is a schematic diagram of an example device 800 for asset tracking that employs an extrema-retentive data buffering and simplification process. The device 800 may be understood to be one example of an integrated tracking device onboard the asset 102 of FIG. 1 or an asset tracking device coupled to the asset 102.

The device 800 includes an interface layer 802 to receive raw data 820 pertaining to an asset (e.g., the asset 102 of FIG. 1). The raw data 820 is received from one or more data sources onboard the asset, such as, for example, an asset Electronic Control Unit (ECU) 822 or a sensor 824 onboard the asset. Another data source may include, for example, a GPS transceiver (whether integrated into the asset or an asset tracking device, if applicable). Another data source may include, in the case where the asset is tracked by an asset tracking device coupled to the asset, a communication port (e.g., onboard diagnostic port, OBD2 port) of the asset, from which the asset tracking device obtains data from an ECU or other data source onboard the asset, through a Controlled Area Network (CAN) or otherwise. The interface layer 802 includes the interfaces for receiving raw data 820 from such data sources, such as an interface for a GPS transceiver, an interface for an accelerometer, and an interface for a communication port of the asset.

The raw data 820 generally describes a property, state, or operating condition of the asset. For example, where the asset is a vehicle, the raw data 820 may describe the location of the vehicle, speed at which the vehicle is travelling, or an engine operating condition (e.g., engine oil temperature, engine RPM, engine cranking voltage).

The device 800 further includes a data buffer 804 to store the raw data 820 (i.e., cycles of raw data along with dynamic groups of carry-over data points) and a memory 806 to store simplified data 826 derived from the raw data 820. The data buffer 804 and memory 806 may be located on the same, or separate, hardware, and may include read-only memory (ROM), random-access memory (RAM), flash memory, magnetic storage, optical storage, or similar, or any combination thereof.

Although only a single element is shown for raw data 820, it is to be understood that the raw data 820 may include several data streams of several different data types, and this raw data 820 may include one or more target sets of data that are to be simplified separately, some of which may include one data dimension and others which may include multiple data dimensions.

The device 800 further includes a controller 810 to execute dataset simplification instructions 812 and data buffer cycling instructions 814. The controller 810 may include one or more of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 810 as described herein. The controller 810 includes a memory, which may include ROM, RAM, flash memory, magnetic storage, optical storage, and similar, or any combination thereof, for storing instructions and data as discussed herein, including the dataset simplification instructions 812 and data buffer cycling instructions 814.

The dataset simplification instructions 812 are to cause the controller 810, when triggered, to perform a dataset simplification algorithm on a cycle of data (i.e., a first cycle of data) to determine one or more data points from that cycle of data to be recorded in the simplified data 826. That is, a dataset simplification algorithm is performed on a set of data that contains a cycle of raw data and a dynamic group of carry-over data points. The dataset simplification algorithm that is applied may be any algorithm that reduces a set of data into a smaller set of data of its most significant data points, such as, for example, a modified version of the RDP algorithm (e.g., modified in the manner described above). As discussed above, performance of a dataset simplification algorithm, and the further cycling of the data buffer 804, may be triggered upon satisfaction of a data logging trigger, such as whenever a data point is added to the data buffer 804, when the data buffer 804 becomes filled, when a timer expires, or another trigger.

The data buffer cycling instructions 814 are to cause the controller 810, when triggered, to prepare the data buffer 804 for a new cycle of raw data, as described above with respect to FIG. 4 and FIG. 5. Preparing the data buffer 804 for a new cycle of data may immediately follow the performance of a dataset simplification algorithm and the determination of whether any points in the data buffer 804 are to be recorded. Preparing the data buffer 804 for a new cycle of raw data may involve determining a dynamic group of carry-over data points, derived from the raw data, to be used in the performance of a subsequent application of the dataset simplification algorithm. Preparing the data buffer 804 (i.e., transitioning to a new cycle of data) may later involve clearing at least a portion of the data buffer 804 and pre-filling the data buffer 804 with carry-over data points (i.e., adding carry-over data points to the data buffer 804). The data buffer cycling instructions 814 are also to cause data points from the raw data 820 to be added to the data buffer 804 in a new cycle of data.

As described above, the dynamic group of carry-over data points may include (i) a last data point from an immediately previous cycle of raw data, (ii) a last data point determined to be recorded in the memory from the immediately previous cycle of raw data or an earlier cycle of raw data. The dynamic group of carry-over data points may further include, where there exists at least one data point between data point (i) and data point (ii): (iii) a data point between data point (i) and data point (ii) that deviates the most from a reference line defined through data point (i) and data point (ii).

In some examples, if the data buffer 804 is cleared between cycles, the carry-over data points may be stored temporarily in a separate memory. In other examples, the carry-over data points may be selectively excluded from the clearing of the data buffer 804, and left in place, or rearranged within the data buffer 804, as appropriate.

The device 800 further includes a communication interface 808 to transmit the simplified data 826 to a server 830, remote from the device 800. The server 830 may be part of a telematics system, such as the telematics system 120 of FIG. 1. The communication interface 808 may include a cellular modem, such as an LTE-M modem, CAT-M modem, or other cellular modem configured for communication via the network with which to communicate with the server 830. The communication interface 808 may be configured for bidirectional communication with the server 830 to receive instructions from the server 830, such as, for example, to make modifications to the instructions 812, 814, for updating.

The server 830 is to receive the simplified data 826 and provide the simplified data 826 for a telematics service or other purposes. Such information may be provided on an ongoing basis or in response to requests. In some examples, the server 830 may be termed an "asset tracking server" which receives simplified data 826 and which may provide an indication of a status of the asset on an ongoing basis or in response to a status request. In some examples, the server 830 may be one computing device that is part of a cloud computing network.

Thus, in a telematics system, an asset tracking device onboard an asset may receive raw data pertaining to the asset, determine a dynamic group of carry-over data points, derived from the raw data, to be used in the performance of a dataset simplification algorithm on the raw data, perform the dataset simplification algorithm on a set of data that contains the raw data and the dynamic group of carry-over data points to determine one or more data points in the set of data to be recorded, and transmit the recorded data points to the server. Such an asset tracking device may batch the received raw data into cycles along with dynamic groups of carry-over data points, and perform the dataset simplification algorithm on said cycles. A dynamic group of carry-over data points may include (i) a last data point from an immediately previous cycle of raw data, (ii) a last data point determined to be recorded from the immediately previous cycle of raw data or an earlier cycle of raw data, and (iii) a data point between data point (i) and data point (ii) that deviates the most from a reference line defined through data point (i) and data point (ii).

Figure 9:
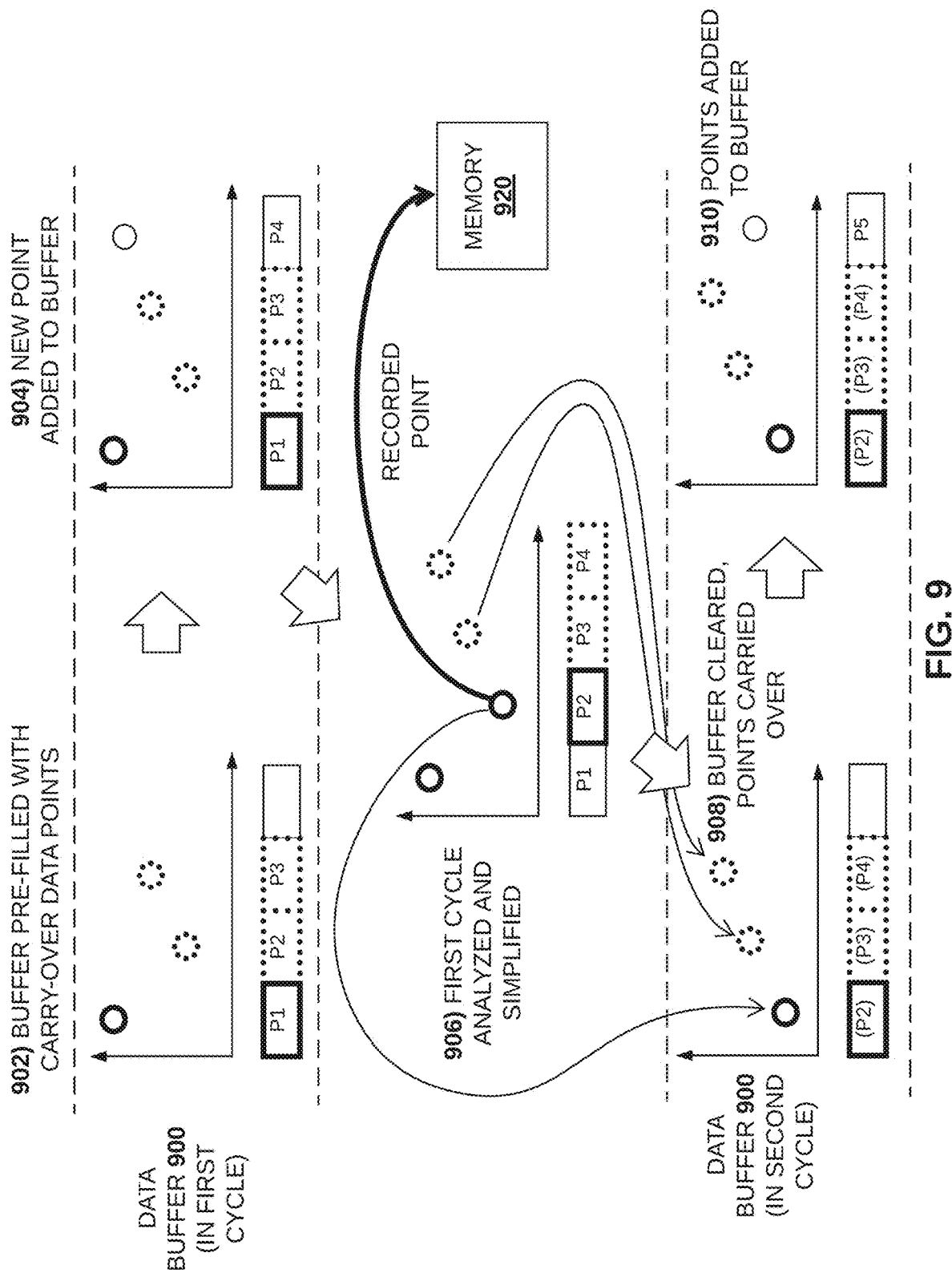
FIG. 9 illustrates the application of an example extrema-retentive data buffering and simplification process to a data buffer that is limited in size to contain no more than one new data point, in addition to a dynamic group of carry-over data points, to be considered for recordation.
Figure 10:
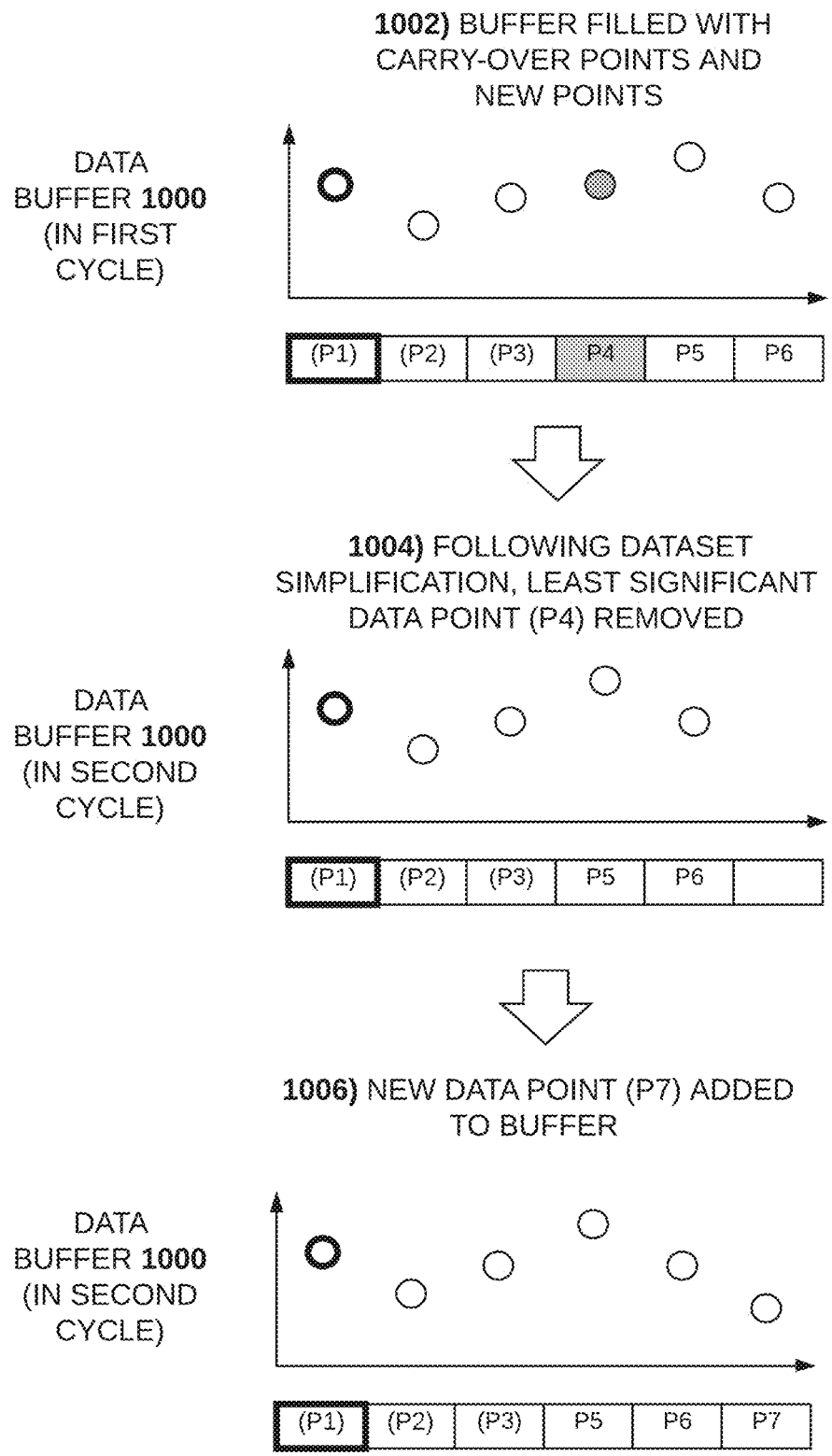
FIG. 10 illustrates the application of an example extrema-retentive data buffering and simplification process to a data buffer in which the least significant data points in the data buffer are replaced with new incoming data points.

With reference to FIG. 9 and FIG. 10, further techniques for increasing the reliability of an extrema-retentive data buffering and simplification process are discussed.

FIG. 9 illustrates the application of an example extrema-retentive data buffering and simplification process to a data buffer 900 that is limited in size to contain no more than one new data point, in addition to a dynamic group of carry-over data points, to be considered for recordation. The process described in FIG. 9 may be employed by any computing device, such as the asset tracking device 800 of FIG. 8, and combined with any of the methods described herein.

A data buffer can in principle contain practically any number of data points for which sufficient memory is available. However, larger data buffers require more memory, which can be scarce on an asset tracking device. Thus, it may be desirable to use a data buffer of minimal size, even while employing an extrema-retentive data buffering and simplification process that involves retaining a dynamic group of carry-over data points.

Thus, the size of a data buffer may be limited to contain no more than one new data point added, in addition to a dynamic group of carry-over data points, to be considered for recordation. In the example shown in FIG. 9, the data buffer 900 is limited in size to contain no more than four data points, including (i) the last data point added to the immediately previous cycle of data, (ii) the last data point determined to be recorded, (iii) the data point between data point (i) and data point (ii) that deviates the most from a reference line defined through data point (i) and data point (ii) (where such a point is present), and (iv) a new data point to be considered for recordation. In this example, the size of the data buffer 900 may be understood to be of size four. Viewed another way, such a process involves no data buffer, as there is only one new data point being considered for recordation at any time. The carry-over data points are retained primarily for reference in the performance of the dataset simplification algorithm. In other examples, the size of such a data buffer may have size greater or less than four, so long as it contains no more than one new data point in addition to one or more carry-over data points.

Otherwise, the data buffer 900 of FIG. 9 is similar to the data buffer 600 of FIG. 6. At step 902, the data buffer 900 is pre-filled with a group of carry-over data points comprising points P1 (the last recorded data point), P3 (the last data point added to the previous cycle of data), and P2 (the "greatest error" data point from the previous cycle of data between points P1 and P3). There is room for one new data point to be added to the data buffer 900 to be considered for recordation.

At step 904, a new data point, P4, is added to the data buffer 900. At step 906, the data buffer 900 is simplified, resulting in the recordation of point P2 in memory 920. Thus, a new group of carry-over data points is determined, comprising points P2 (now the last recorded data point), P4 (now the last data point added to the data buffer), and P3 (now the point of "greatest error" between points P2 and P4.

At step 908, the data buffer 900 is (partially) cleared (of point P1), and pre-filled with points P2, P3, and P4. Again, there is room for one new data point to be added to the data buffer 900 to be considered for recordation (e.g., point P5 at step 910).

Thus, an extrema-retentive data buffering and simplification process may be employed using data buffers of small sizes.

FIG. 10 illustrates the application of an example extrema-retentive data buffering and simplification process to a data buffer 1000 in which the least significant data points in the data buffer 1000 are replaced with new incoming data points. The process described in FIG. 10 may be employed by any computing device, such as the asset tracking device 800 of FIG. 8.

Thus, rather than the data buffer 1000 being cleared of all data points save for a small number of designated carry-over data points, each data point in the data buffer 1000 is carried over to the next cycle of data, except the least significant data point, which is ejected from the data buffer 1000. The least significant data point may be determined as per the dataset simplification algorithm applied to the data buffer 1000, and in some examples, may be determined to be the least significant data point following the last data point in the data buffer 1000 determined to be recorded (i.e., the data point that deviates the least from a line defined through the last recorded data point and the last data point in the buffer 1000). In other examples, where there are multiple recorded or to-be-recorded data points in the data buffer 1000, the least significant data point may be determined to be the data point that deviates the least from any reference line. In still other examples, the least significant data point may be determined to be the least significant data point between the two most recently recorded data points. Other techniques may be used to identify one or more "least significant" data points to remove from the data buffer 1000, which may not necessarily be the first or last data points added to the data buffer 1000. In any case, the size of the group of carry-over data points may be understood to be of any size less than n, where n is the size of the data buffer 1000. Such a process provides for exposure of each new data point to the most contextually important (the most significant) data points recently added to the data buffer 1000, which may provide for a more robust application of a dataset simplification algorithm.

In the present example, the data buffer 1000 is of size six. At stage 1002, the data buffer 1000 is filled with points P1, P2, P3, P4, P5, and P6, where point P1 is the most recently recorded data point, and points P2, P3, P4, and P5 are additional carry-over data points from previous cycles of data. With the data buffer 1000 being filled, a dataset simplification algorithm is run on the data buffer 1000. For simplicity, it is assumed that no additional data points are determined to be recorded. However, point P4 is determined to be the least significant data point—that is, the data point that deviates the least from a reference line drawn through points P1 and P6. This "least error" data point is therefore removed from the data buffer 1000, freeing up room for a new data point to be added, as shown at stage 1004. At stage 1006, a new data point, P7, is added to the data buffer 1000, which triggers the performance of another iteration of the dataset simplification algorithm.

It is to be understood that the process described herein may operate with any number of "least significant" data points being removed from the data buffer 1000 between each cycle of data (e.g., the removal of two "least significant" data points, three "least significant" data points, etc.). Further, when there is a "tie" for determining which of any set of points is the "least significant" data point with respect to any given reference line, it may be determined that the data point which occurs earlier in the set of data is to be selected as the "least significant" data point, as it has been determined that a data point situated later in a set of data may be more likely to have a greater impact on how that set of data is ultimately simplified, at least in view of the considerations regarding the transition of a data buffer from one cycle to the next, as described herein.

Thus, an extrema-retentive data buffering and simplification process may be employed using data buffers that contain large groups of carry-over data points to provide for a robust, well contextually-informed, dataset simplification process.

Figure 11:
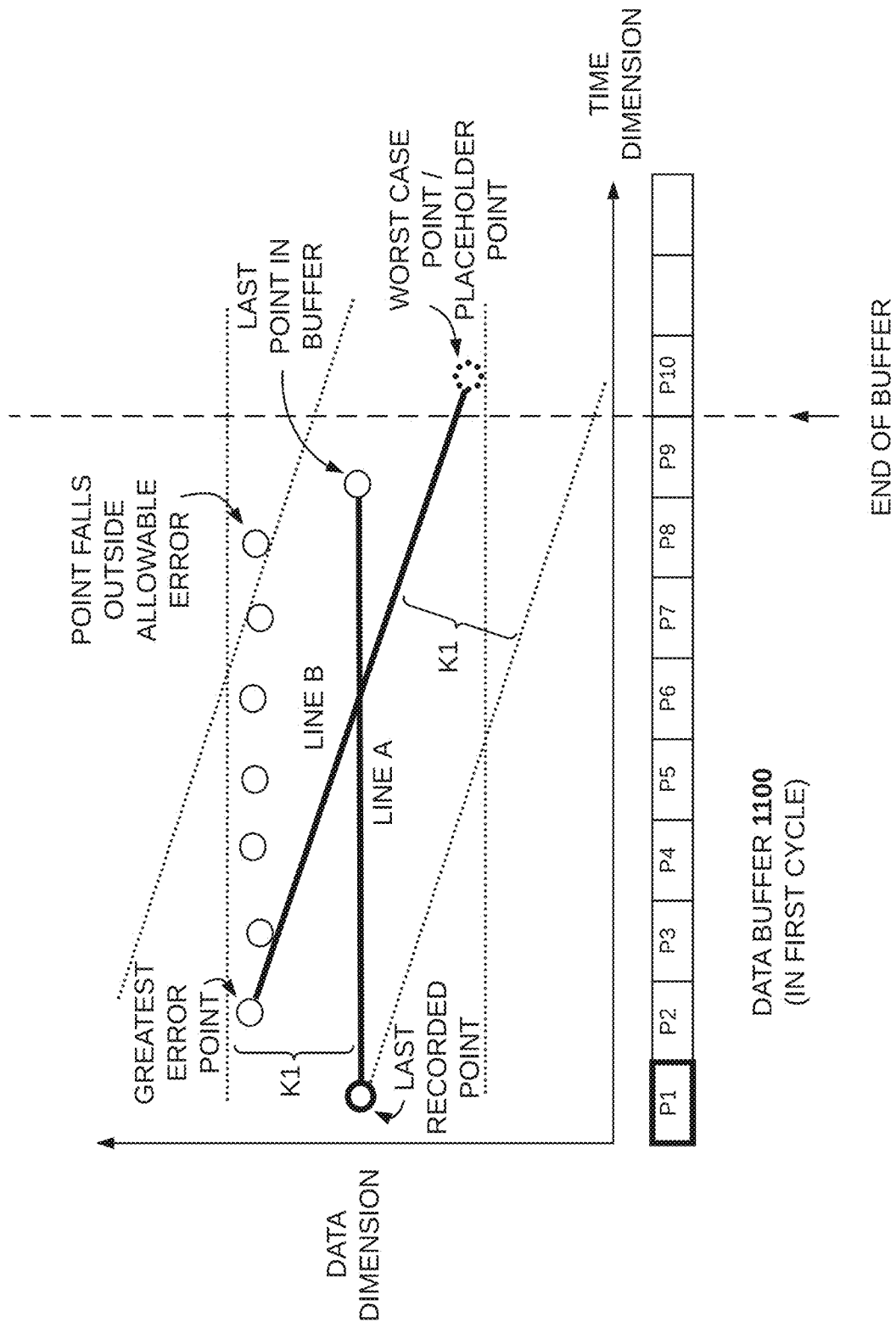
FIG. 11 is another example data-time plot of a set of data to be simplified by a dataset simplification algorithm, indicating a placeholder data point that is involved in an example extrema-retentive data buffering and simplification process.
Figure 12A:
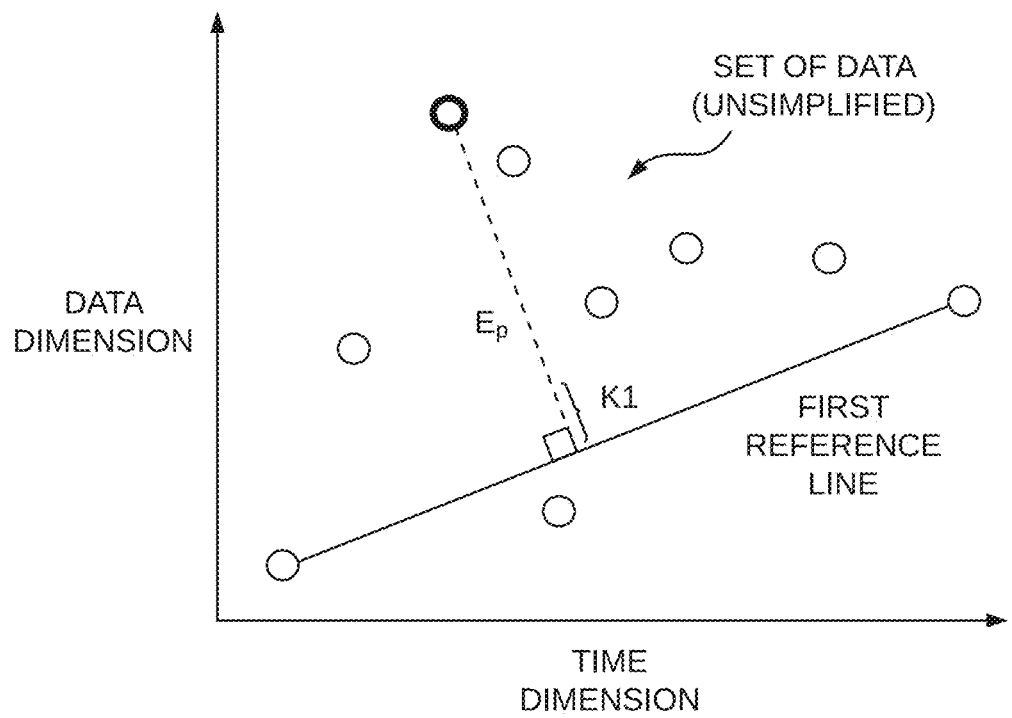
FIG. 12A is an example data-time plot of a set of data to be simplified by a dataset simplification algorithm, indicating a distance representing a first threshold value that is involved in the dataset simplification algorithm.
Figure 12B:
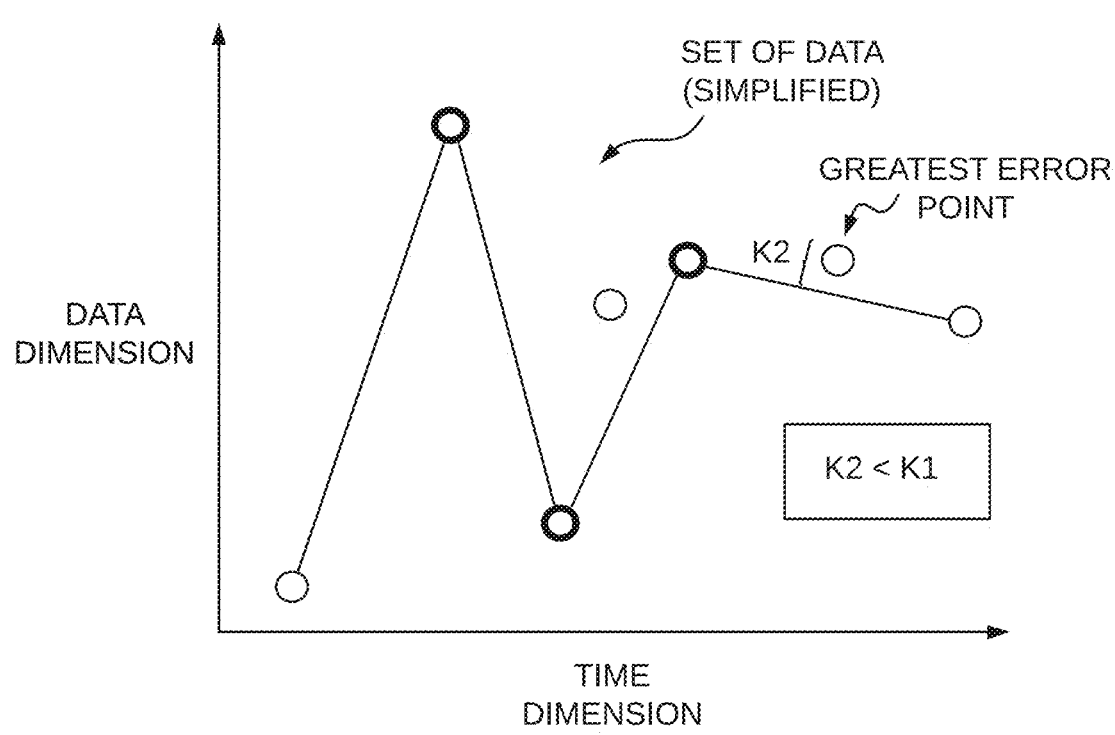
FIG. 12B is another example data-time plot of the set of data of FIG. 12A after simplification by the dataset simplification algorithm, indicating a distance representing a second threshold value that is involved in an example extrema-retentive data buffering and simplification process.

With reference to FIG. 11, FIG. 12A, and FIG. 12B, further techniques for increasing the reliability of a data buffering and simplification process are discussed. As described herein, a data buffering and simplification process may further involve the application of an algorithm that forces the last point in a data buffer to be recorded under certain circumstances (rather than merely passing it over to the next cycle of data), in order to reduce the likelihood that a data point that falls outside the maximum allowable error threshold of the dataset simplification algorithm will be inadvertently missed. The processes described in FIG. 11, and FIG. 12A and FIG. 12B may be employed by any computing device, such as the asset tracking device 800 of FIG. 8, and combined with any of the methods described herein.

FIG. 11 is another example data-time plot of a set of data to be simplified by a dataset simplification algorithm. FIG. 11 illustrates how, under some circumstances, a data point that falls outside the maximum allowable error threshold of a dataset simplification algorithm may be missed, and further illustrates a solution to mitigate against this risk.

A data buffer 1100, in a first cycle of data, contains data points P1, P2, P3, P4, P5, P6, P7, P8, and P9. Upon simplification of the first cycle of data, suppose that only data point P1 is recorded, and that data points P2-P8 each fall within the allowable error threshold of the dataset simplification algorithm (K1), with reference to reference line (Line A), defined through P1 and P9. Further, suppose that data point P2 is the "greatest error" data point that deviates the most from reference line A, but within the allowable error threshold. Thus, under an extrema-retentive data buffering and simplification process, as described herein, data points P1, P2, and P9 are carried into the next cycle of the data buffer 1100, and data points P3-P8 are discarded.

However, suppose that in the next cycle of data, a new data point P10 is added to the data buffer 1100 that deviates significantly from, but within the error bounds of, the trend that would be predicted by reference line A. That is, suppose that data point P10 is situated at or near an error bound (in either direction) defined around line A by the allowable error threshold of the dataset simplification algorithm. Data point P10 may be referred to as a "worst case scenario" data point, because if it were to become recorded by the dataset simplification algorithm, then its inclusion in the simplified set of data could "bend" the simplified set of data away from certain data points from the first cycle of data (i.e., points P3-P8) that were previously discarded, causing one or more of such points to fall outside the allowable error threshold of the resulting simplified set of data (e.g., point P8).

The proposed solution is to generate a placeholder data point (P10) at the location of the "worst case scenario" data point. This "worst case scenario" data point is located immediately following the last data point in the first cycle of data (P9), and deviates as much as possible, within the allowable error threshold of the dataset simplification algorithm, from a reference line (line A) defined through the last point in the first cycle of data (P9) and the last data point in the first cycle of data determined to be recorded by the dataset simplification algorithm (P1), on the opposite side of the reference line (line A) as the "greatest error" data point). Then it is determined whether any data points between these two data points (P1 and P9) deviate, in excess of the allowable error threshold of the dataset simplification algorithm, from a second reference line (line B) defined through the placeholder data point (P10) and the "greatest error" data point from the first cycle of data (P2) (where the "greatest error" data point is carried forward into the next cycle of data). If it is determined that there is at least one such data point (between P1 and P9) that deviates, in excess of the allowable error threshold of the dataset simplification algorithm, from reference line B, then the last point in the buffer (P9) is forced to be recorded.

Recordation of the last point in the data buffer under these circumstances ensures that none of the data points between P1 and P9 fall outside the allowable error threshold, since those data points will fall within the error bounds of a line defined between P1 and P9. Thus, the risk that a "worst case scenario" data point will result in certain data points falling outside the allowable error threshold is reduced. Such data points may be considered operationally salient, and it may be desired that such data points are captured, or at least remain within the allowable error threshold of the dataset simplification algorithm. FIGS. 12A-12B, below, discuss further techniques to avoid such risks.

FIG. 12A is an example data-time plot of a set of data to be simplified by a dataset simplification algorithm. FIG. 12A indicates a distance representing a first threshold value (K1) that is involved in the dataset simplification algorithm (e.g., the allowable error threshold used in the application of a RDP algorithm or a variant thereof). In other words, performing the dataset simplification algorithm involves comparing, against the threshold value K1, a distance of each data point to be considered for recordation to its relevant reference line, in accordance with the dataset simplification algorithm. This threshold value K1 is to be distinguished from the second threshold value K2, shown in FIG. 12B, which is involved in an additional step of another example data buffering and simplification process.

Whereas FIG. 12A shows a set of data prior to simplification (using threshold value K1), FIG. 12B shows the same set of data after simplification. Following simplification, an extrema-retentive data buffering and simplification process may involve comparing, against the second threshold value K2 (that is less than the first threshold value K1), the distance of the "greatest error" data point (the point between the last recorded data point and the last point in the buffer that deviates the most from a reference line defined through those two points), to its relevant reference line (defined through the aforementioned two points). The second threshold value K2 may be a fixed amount less than the first threshold value K1, or may be proportionate to the first threshold value K1 (e.g., K2 may be 95% of K1). When it is determined that the distance of this "greatest error" data point to the relevant reference line is greater than the second threshold value K2, the last data point in the data buffer may be forced to be recorded. As with the technique described in FIG. 11, this technique may reduce the risk that a "worst case scenario" data point will result in certain data points falling outside the allowable error threshold.

Thus, it should be seen that the data collected from an asset may be simplified into operationally-salient data for a telematics system through an extrema-retentive data buffering and simplification process. Such a process not only saves on data storage and data transmission costs that would otherwise be incurred if data points were saved periodically, but also ensures that extrema data points, that may be of particular interest in telematics, are likely to be recorded, even on asset tracking devices that temporarily store data in small data buffers.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
obtaining, from a data source associated with a vehicular asset, a stream of raw data pertaining to the vehicular asset;
storing a first set of data points from the stream of raw data in a first cycle of data in a data buffer;
performing a dataset simplification algorithm on the first cycle of data to determine whether one or more data points from the first cycle of data in the data buffer are to be recorded in a data store different than the data buffer;
in response to determining that one or more data points from the first cycle of data in the data buffer are to be recorded in the data store different than the data buffer, recording the one or more data points from the first cycle of data in the data store different than the data buffer;
preparing the data buffer for a second cycle of data, including determining, from the first set of data points in the data buffer, a group of carry-over data points to be included in the second cycle of data;

storing a second set of data points from the stream of raw data in the second cycle of data in the data buffer, wherein:
  the second cycle of data in the data buffer includes the group of carry-over data points and the second set of data points,
  the group of carry-over data points are included in the data buffer prior to storing the second set of data points in the second cycle of data in the data buffer, and
  the group of carry-over data points comprises:
    (i) a last data point added to the first cycle of data,
    (ii) a last data point determined to be recorded in the data store from the first cycle of data or a last recorded data point from an earlier cycle of data, wherein data point (ii) is different from data point (i), and
    (iii) another data point, wherein at least one of data point (i), data point (ii) and data point (iii) is an extrema data point;
performing the dataset simplification algorithm on the second cycle of data to determine whether one or more data points from the second cycle of data in the data buffer are to be recorded in the data store;
in response to determining that one or more data points from the second cycle of data in the data buffer are to be recorded in the data store, recording the one or more data points from the second cycle of data in the data store; and
transmitting a simplified data stream including the recorded data points in the data store to a telematics system.

2. The method of claim 1, wherein data point (iii) includes a data point between data point (i) and data point (ii) that deviates the most from a reference line defined through data point (i) and data point (ii).

3. The method of claim 2, wherein the data buffer is limited in size to contain no more than four data points, including data point (i), data point (ii), data point (iii), and (iv) a new data point added to the data buffer to be considered for recordation.

4. The method of claim 2, wherein:
performing the dataset simplification algorithm involves comparing, against a first threshold value, a distance of a data point to be considered for recordation to a reference line in accordance with the dataset simplification algorithm; and
the method further comprises:
  comparing, against a second threshold value that is less than the first threshold value, a distance of data point (iii) to a relevant reference line as defined by the dataset simplification algorithm; and
  when it is determined that the distance of data point (iii) to the relevant reference line is greater than the second threshold value, forcing data point (i) to be recorded.

5. The method of claim 1, wherein the method further comprises, following performance of the dataset simplification algorithm on the first cycle of data:
generating a placeholder data point at a location of a new data point added to the data buffer, wherein the placeholder data point immediately follows (iv) a last data point in the first cycle of data, and deviates significantly from, but within an allowable error threshold of the dataset simplification algorithm, from a first reference line defined through data point (iv) and (v) a last data point in the first cycle of data determined to be recorded by the dataset simplification algorithm;
determining whether any data points between data point (iv) and data point (v) deviate, in excess of the allowable error threshold of the dataset simplification algorithm, from a second reference line defined through the placeholder data point [RN] and (vi) a data point between data point (iv) and data point (v) that deviates the most from the first reference line; and
when it is determined that there is at least one data point between data point (iv) and data point (v) that deviates, in excess of the allowable error threshold of the dataset simplification algorithm, from the second reference line, forcing data point (iv) to be recorded.

6. The method of claim 1, wherein the dataset simplification algorithm is performed each time a new data point is added to the data buffer from the stream of raw data.

7. The method of claim 1, wherein preparing the data buffer for the second cycle of data comprises removing, each time a new data point is to be added to the data buffer, a least one significant data point from the data buffer, and retaining the remaining data points in the data buffer.

8. The method of claim 1, wherein the dataset simplification algorithm is performed upon satisfaction of a data logging trigger, wherein satisfaction of the data logging trigger comprises:
  the data buffer being filled;
  a timer expiring; or
  a data point obtained from the stream of raw data deviating from an expected range in excess of a threshold amount.

9. The method of claim 1, wherein the stream of raw data pertaining to a vehicular asset describes a property, state, or operating condition of the vehicular asset.

10. The method of claim 1, wherein the data source comprises an electronic control unit (ECU) of the vehicular asset or a sensor onboard the vehicular asset.

11. A device comprising:
an interface layer to obtain, from a data source associated with a vehicular asset, a stream of raw data pertaining to the vehicular asset;
a data buffer;
a data store;
a controller configured to:
  store a first set of data points from the stream of raw data in a first cycle of data in the data buffer;
  perform a dataset simplification algorithm on the first cycle of data to determine whether one or more data points from the first cycle of data in the data buffer are to be recorded in the data store different than the data buffer;
  in response to determining that one or more data points from the first cycle of data in the data buffer are to be recorded in the data store different than the data buffer, record the one or more data points from the first cycle of data in the data store different than the data buffer;
  prepare the data buffer for a second cycle of data, including determining, from the first set of data points in the data buffer, a group of carry-over data points to be included in the second cycle of data;
  store a second set of data points from the stream of raw data in the second cycle of data in the data buffer, wherein:
    the second cycle of data in the data buffer includes the group of carry-over data points and the second set of data points, the group of carry-over data points are included in the data buffer prior to storing the second set of data points in the second cycle of data in the data buffer, and the group of carry-over data points comprises:
(i) a last data point added to the first cycle of data,
(ii) a last data point determined to be recorded in the data store from the first cycle of data or a last recorded data point from an earlier cycle of data,
wherein data point (ii) is different from data point (i), and
(iii) another data point, wherein at least one of data point (i), data point (ii) and data point (iii) is an extrema data point;

perform the dataset simplification algorithm on the second cycle of data to determine whether one or more data points from the second cycle of data in the data buffer are to be recorded in the data store; and in response to determining that one or more data points from the second cycle of data in the data buffer are to be recorded in the data store, record the one or more data points from the second cycle of data in the data store; and a communication interface to transmit a simplified data stream including the recorded data points in the memory data store to a telematics system.

12. The device of claim 11, wherein the data point (iii) includes a data point between data point (i) and data point (ii) that deviates the most from a reference line defined through data point (i) and data point (ii).

13. The device of claim 11, wherein the data buffer is limited in size to contain no more than one new data point added to the data buffer, in addition to the group of carry-over data points, to be considered for recordation.

14. The device of claim 12, wherein:
the controller performs the dataset simplification algorithm by, at least in part, comparing, against a first threshold value, a distance of a data point to be considered for recordation to a reference line as defined by the dataset simplification algorithm; and
the controller is further to:
compare, against a second threshold value that is less than the first threshold value, a distance of data point (iii) to a relevant reference line in accordance with the dataset simplification algorithm; and
when it is determined that the distance of data point (iii) to the relevant reference line is greater than the second threshold value, force data point (i) to be recorded.

15. The device of claim 11, wherein the controller is triggered to perform the dataset simplification algorithm each time a new data point is added to the data buffer from the stream of raw data.

16. The device of claim 11, wherein the controller is triggered to perform the dataset simplification algorithm upon satisfaction of a data logging trigger, wherein satisfaction of the data logging trigger comprises:
the data buffer being filled;
a timer expiring; or
a data point obtained from the stream of raw data deviating from an expected range in excess of a threshold amount.

17. The device of claim 11, wherein the interface layer is configured to obtain a stream of raw data from a data source associated with a non-vehicular asset.

\* \* \* \* \*